United States Patent
Kono et al.

(10) Patent No.: US 11,162,740 B2
(45) Date of Patent: Nov. 2, 2021

(54) HEAT STORAGE AND DISSIPATION APPARATUS

(71) Applicant: NIPPON PAINT HOLDINGS CO., LTD., Osaka-shi (JP)

(72) Inventors: Tomohiro Kono, Tokyo (JP); Toshitaka Koyama, Tokyo (JP)

(73) Assignee: NIPPON PAINT HOLDINGS CO., LTD., Osaka (JP)

( * ) Notice: Subject to any disclaimer, the term of this patent is extended or adjusted under 35 U.S.C. 154(b) by 285 days.

(21) Appl. No.: 16/473,694

(22) PCT Filed: Dec. 13, 2017

(86) PCT No.: PCT/JP2017/044713
§ 371 (c)(1),
(2) Date: Jun. 26, 2019

(87) PCT Pub. No.: WO2018/123590
PCT Pub. Date: Jul. 5, 2018

(65) Prior Publication Data
US 2019/0323782 A1 Oct. 24, 2019

(30) Foreign Application Priority Data
Dec. 28, 2016 (JP) .............................. JP2016-255858

(51) Int. Cl.
*F28D 20/00* (2006.01)
*B01D 45/16* (2006.01)
*C09K 5/16* (2006.01)

(52) U.S. Cl.
CPC ........... *F28D 20/003* (2013.01); *B01D 45/16* (2013.01); *C09K 5/16* (2013.01); *F28D 2020/0073* (2013.01)

(58) Field of Classification Search
CPC ........... F28D 20/003; F28D 2020/0073; B01D 45/16; C09K 5/16
See application file for complete search history.

(56) References Cited

U.S. PATENT DOCUMENTS 4,303,121 A * 12/1981 Pangborn .............. F28D 20/003
165/104.12
4,393,924 A * 7/1983 Asami ................... F28D 20/003
165/104.12

(Continued)

FOREIGN PATENT DOCUMENTS

JP H04126961 A 4/1992
JP H07180539 A 7/1995

(Continued)

OTHER PUBLICATIONS

Dec. 30, 2020, Office Action issued by the China National Intellectual Property Administration in the corresponding Chinese Patent Application No. 201780081075.9.

(Continued)

Primary Examiner — Devon Russell
(74) Attorney, Agent, or Firm — Kenja IP Law PC

(57) ABSTRACT

Provided is a heat storage and dissipation apparatus capable of direct heat exchange with a heat storage body. A heat storage and dissipation apparatus (100) comprises: a heat storage body (10) that reacts with a component contained in a primary gas (G1); and a heat storage body housing portion (20) that houses the heat storage body (10), wherein the heat storage body housing portion (20) has: a housing space (S1) that houses the heat storage body (10); a first flow opening (20a) that communicates with the housing space (S1) and is capable of flowing the primary gas (S1); and a second flow opening (20b) that communicates with the housing space (S1) and is capable of flowing the primary gas (S1).

13 Claims, 12 Drawing Sheets

(56) References Cited

U.S. PATENT DOCUMENTS

| | | | |
|---|---|---|---|
| 10,443,954 B1* | 10/2019 | Zidan | C01B 6/246 |
| 2005/0253019 A1* | 11/2005 | Hoehne | B64D 11/02 |
| | | | 244/129.1 |
| 2007/0141322 A1* | 6/2007 | Kamper | C01B 3/001 |
| | | | 428/317.9 |
| 2007/0251837 A1* | 11/2007 | Stach | B01J 20/2803 |
| | | | 206/0.7 |
| 2011/0154737 A1* | 6/2011 | Wexler | B01J 20/0281 |
| | | | 48/197 R |
| 2013/0075052 A1* | 3/2013 | Hara | C04B 35/01 |
| | | | 165/10 |
| 2016/0177161 A1* | 6/2016 | Hanzawa | F01K 3/12 |
| | | | 62/4 |
| 2016/0290685 A1* | 10/2016 | Aman | F25B 17/08 |

FOREIGN PATENT DOCUMENTS

| | | | |
|---|---|---|---|
| JP | 2013113478 A | 6/2013 | |
| JP | 2014105925 A | 6/2014 | |
| JP | 2014206363 A | 10/2014 | |
| JP | 2015105809 A | 6/2015 | |
| JP | 2016075434 A | 5/2016 | |

OTHER PUBLICATIONS

Apr. 30, 2020, Office Action issued by the China National Intellectual Property Administration in the corresponding Chinese Patent Application No. 201780081075.9.

May 27, 2020, Office Action issued by Intellectual Property India in the corresponding Indian Patent Application No. 201917025641.

Feb. 13, 2018, International Search Report issued in the International Patent Application No. PCT/JP2017/044713.

Sep. 1, 2020, Notification of Reasons for Refusal issued by the Japan Patent Office in the corresponding Japanese Patent Application No. 2016-255858.

Jul. 2, 2019, International Preliminary Report on Patentability issued in the International Patent Application No. PCT/JP2017/044713.

* cited by examiner

HEAT STORAGE AND DISSIPATION APPARATUS

TECHNICAL FIELD

The present disclosure relates to a heat storage and dissipation apparatus.

BACKGROUND

A conventional heat storage and dissipation apparatus is a unit formed by placing, at one end in a case, a reaction portion that houses a heat storage body (chemical heat storage material) such as calcium oxide (for example, see PTL 1). As a result of the end of the unit being inserted into a port of an industrial furnace, the heat storage body heats the inside of the industrial furnace through the case, and stores heat of the inside of the industrial furnace. Another conventional heat storage and dissipation apparatus is a reactor including a heat exchange portion together with a heat storage body (reactant), such as CaO (calcium oxide), that causes reversible thermal reaction (for example, see PTL 2). Through the heat exchange portion, the reactor releases heat of reaction of the heat storage body to outside the reactor, and stores heat supplied from outside the reactor.

CITATION LIST

Patent Literatures

PTL 1: JP 2013-113478 A
PTL 2: JP 2014-206363 A

SUMMARY

Technical Problem

However, in such conventional heat storage and dissipation apparatuses, the heat storage body is housed in the case or the reactor, and therefore direct heat exchange between the heat medium and the heat storage body cannot be performed. Thus, the conventional heat storage and dissipation apparatuses have room for improvement in heat exchange efficiency.

Moreover, in the conventional heat storage and dissipation apparatuses, a heat exchange portion such as a heat medium flow path needs to be provided to perform heat exchange through the heat exchange portion. The heat exchange portion is typically provided with a fin to improve heat exchange efficiency. Providing the heat exchange portion such as a heat medium flow path or the fin hampers, for example, size reduction of heat storage and dissipation apparatuses, and also leaves room for improvement in productivity, cost, etc.

It could therefore be helpful to provide a heat storage and dissipation apparatus capable of direct heat exchange between a heat medium and a heat storage body.

Solution to Problem

A heat storage and dissipation apparatus according to the present disclosure comprises: a heat storage body that reacts with a component contained in a primary gas; and a heat storage body housing portion that houses the heat storage body, wherein the heat storage body housing portion has: a housing space that houses the heat storage body; a first flow opening that communicates with the housing space and is capable of flowing the primary gas; and a second flow opening that communicates with the housing space and is capable of flowing the primary gas.

The heat storage and dissipation apparatus according to the present disclosure can perform direct heat exchange between the heat medium and the heat storage body.

The heat storage and dissipation apparatus according to the present disclosure may further comprises a preheating portion that preheats the housing space, wherein the preheating portion may have: a preheating gas-filled space located adjacent to the housing space with a partition wall therebetween; and a preheating gas inlet that communicates with the preheating gas-filled space and is capable of introducing a preheating gas.

In this case, a decrease in the heat generation performance of the heat storage body can be efficiently prevented by using the preheating gas, without preheating the heat storage body using a device such as a heating coil.

In the heat storage and dissipation apparatus according to the present disclosure, the primary gas and the preheating gas may be the same gas.

In this case, the heat storage body can be preheated efficiently.

Preferably, the heat storage and dissipation apparatus according to the present disclosure further comprises a same gas supply portion capable of supplying the same gas to the first flow opening of the heat storage body housing portion and the preheating gas inlet of the preheating portion.

In this case, the heat storage body can be preheated efficiently.

In the heat storage and dissipation apparatus according to the present disclosure, the same gas supply portion may include: a primary gas flow path capable of supplying the same gas to the first flow opening of the heat storage body housing portion; a preheating gas flow path that branches off from the primary gas flow path and is capable of supplying the same gas to the preheating gas inlet of the preheating portion; and at least one switching valve that causes at least one of the primary gas flow path and the preheating gas flow path to communicate with corresponding at least one of the first flow opening of the heat storage body housing portion and the preheating gas inlet of the preheating portion.

In this case, the supply of the same gas can be easily controlled by simple operation of merely controlling the switching valve.

Preferably, the heat storage and dissipation apparatus according to the present disclosure further comprises a primary gas supply change portion capable of supplying at least one of the primary gas and a secondary gas different from the primary gas, to the first flow opening of the heat storage body housing portion.

In this case, different heat media can be released.

Preferably, in the heat storage and dissipation apparatus according to the present disclosure, the primary gas supply change portion includes: a primary gas flow path capable of supplying the primary gas to the first flow opening of the heat storage body housing portion; a secondary gas flow path that meets the primary gas flow path and is capable of supplying the secondary gas to the first flow opening of the heat storage body housing portion; and at least one switching valve that causes at least one of the primary gas flow path and the secondary gas flow path to communicate with the first flow opening of the heat storage body housing portion.

In this case, the supply of the primary gas and the secondary gas can be easily controlled by simple operation of merely controlling the switching valve.

Preferably, the heat storage and dissipation apparatus according to the present disclosure further comprises a secondary gas decarboxylation treatment portion that subjects the secondary gas to decarboxylation treatment.

In this case, carboxylation of the heat storage body caused by the secondary gas can be suppressed, with it being possible to maintain the heat generation performance and heat storage performance of the heat storage body for a long time.

Preferably, the heat storage and dissipation apparatus according to the present disclosure further comprises a primary gas decarboxylation treatment portion that subjects the primary gas to decarboxylation treatment.

In this case, carboxylation of the heat storage body caused by the primary gas can be suppressed, with it being possible to maintain the heat generation performance and heat storage performance of the heat storage body for a long time.

Preferably, the heat storage and dissipation apparatus according to the present disclosure further comprises at least one powder separation portion that separates a powder from a gas released from the heat storage body housing portion.

In this case, gas not containing any pulverized heat storage body can be released.

Preferably, in the heat storage and dissipation apparatus according to the present disclosure, the at least one powder separation portion is one powder separation portion, and the heat storage and dissipation apparatus further comprises: a first introduction path capable of introducing a gas released from the first flow opening of the heat storage body housing portion into the one powder separation portion; a first switching valve that causes the first flow opening of the heat storage body housing portion to communicate with the first introduction path; a second introduction path capable of introducing a gas released from the second flow opening of the heat storage body housing portion into the one powder separation portion; a second switching valve that causes the second flow opening of the heat storage body housing portion to communicate with the second introduction path; and a third switching valve that causes one of the first introduction path and the second introduction path to communicate with the powder separation portion.

In this case, the release of the gas not containing any pulverized heat storage body can be easily controlled by simple operation of merely controlling three switching valves.

Preferably, in the heat storage and dissipation apparatus according to the present disclosure, the powder separation portion includes a centrifugation-type powder separator.

In this case, the powder contained in the gas can be separated easily.

Advantageous Effect

It is thus possible to provide a heat storage and dissipation apparatus capable of direct heat exchange between a heat medium and a heat storage body.

DETAILED DESCRIPTION

Various embodiments of the present disclosure will be described below, with reference to drawings.

Figure 1:
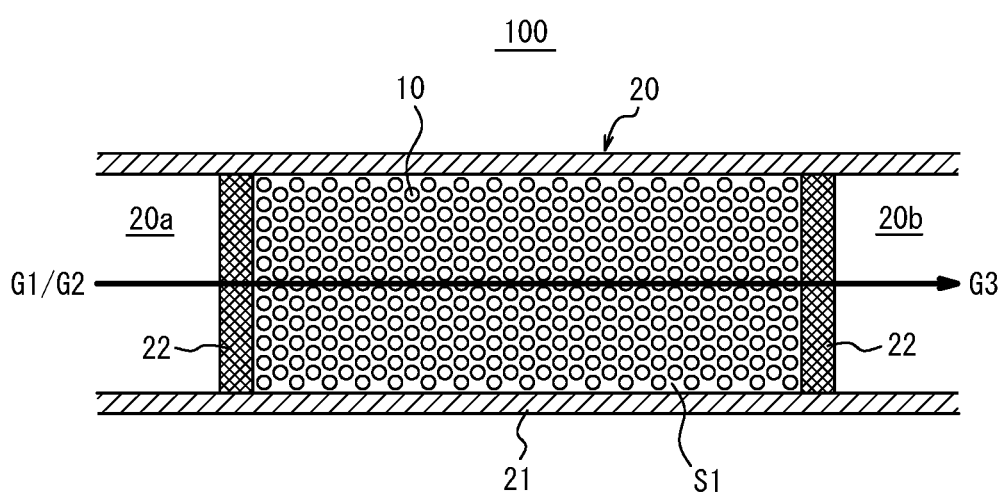
FIG. 1 is a schematic sectional view illustrating a heat storage and dissipation apparatus according to Embodiment 1 of the present disclosure.

In FIG. 1, reference sign 100 is a heat storage and dissipation apparatus according to Embodiment 1 of the present disclosure.

Reference sign 10 is a heat storage body that reacts with a component contained in a primary gas G1. The heat storage body 10 is made of a chemical heat storage material capable of reversible operation. In this embodiment, the chemical heat storage material reacts with water molecules $H_2O$ contained in the primary gas G1 to generate heat, and, after the reaction ends, heat generation performance is restored by separating the water molecules $H_2O$ by heating or decompression. Such a chemical heat storage material contains, for example, calcium oxide or magnesium oxide as a main component.

In this embodiment, the heat storage body 10 is made of a chemical heat storage material containing a group 2 element compound and a silicone polymer as components. Specifically, the heat storage body 10 is made of a chemical heat storage material containing a group 2 element compound, a boron compound, and a silicone polymer as components. It is preferable that the group 2 element compound is calcium oxide, and, in the chemical heat storage material, the content of the calcium atom is 13 mass % to 59 mass %, the content of the boron atom is 0.4 mass % to 11.3 mass %, and the content of the silicon atom is 4.8 mass % to 33.2 mass %. It is also preferable that the group 2 element compound is magnesium oxide, and, in the chemical heat storage material, the content of the magnesium atom is 8.3 mass % to 46.5 mass %, the content of the boron atom is 0.5 mass % to 11.9 mass %, and the content of the silicon atom is 6.2 mass % to 35.1 mass %. The boron compound includes, for example, at least one selected from the group consisting of boric acid, trialkyl borate, and triaryl borate. The silicone polymer is, for example, a silicone polymer resulting from condensation of at least one (hereafter also referred to as alkoxysilane, etc.) selected from the group consisting of alkoxysilane and its hydrolyzate and condensate.

In this embodiment, the primary gas G1 preferably contains water molecules $H_2O$. The primary gas G1 is, for example, water vapor (steam). The primary gas G1 can be supplied in both a high temperature state and a low temperature state.

Reference sign 20 is a heat storage body housing portion that houses the heat storage body 10.

The heat storage body housing portion 20 has a housing space S1 for housing the heat storage body 10. In this embodiment, the heat storage body housing portion 20 includes a cylindrical member 21 having an internal path and two division walls 22. In this embodiment, the housing space S1 is filled with a plurality of heat storage bodies 10. The housing space S1 is defined by the cylindrical member 21 and the two division walls 22. In this embodiment, the two division walls 22 are each composed of a permeable member such as a metal mesh. That is, the two division walls 22 ensure the ventilation of the housing space S1.

The heat storage body housing portion 20 has a first flow opening 20a that communicates with the housing space S1 and is capable of flowing the primary gas G1. In this embodiment, the first flow opening 20a communicates with the housing space S1 through the division wall 22. In this embodiment, the first flow opening 20a is formed by part of the cylindrical member 21 (one end of the cylindrical member 21). In this embodiment, the primary gas G1 can be supplied to the first flow opening 20a. Moreover, in this embodiment, a secondary gas G2 different from the primary gas G1 can flow through the first flow opening 20a. The secondary gas G2 is, for example, indoor or outdoor air, or dry air. Switching between the primary gas G1 and the secondary gas G2 can be, for example, performed by switching valves as described later.

The heat storage body housing portion 20 also has a second flow opening 20b that communicates with the housing space S1 and is capable of flowing the primary gas G1. In this embodiment, the second flow opening 20b communicates with the housing space S1 through the division wall 22. In this embodiment, the second flow opening 20b is formed by part of the cylindrical member 21 (the other end of the cylindrical member 21). In this embodiment, the second flow opening 20b can release the primary gas G1 or the secondary gas G2 that has passed through the housing space S1 housing the heat storage body 10. That is, in this embodiment, the second flow opening 20b can release the primary gas G1 or the secondary gas G2 that has passed through the heat storage body 10 to undergo heat exchange, as a heat medium G3.

Methods of using the heat storage and dissipation apparatus 100 according to this embodiment will be described below.

[Heat Dissipation Mode]

The heat storage and dissipation apparatus 100 according to this embodiment can release the heated heat medium G3, by supplying gas containing water molecules $H_2O$ to the heat storage body 10 containing a group 2 element compound such as calcium oxide or magnesium oxide.

In the heat storage and dissipation apparatus 100 according to this embodiment, first, the primary gas G1 is supplied to the first flow opening 20a of the heat storage body housing portion 20. In this embodiment, the primary gas G1 contains water molecules $H_2O$. In this embodiment, factory steam is used as the primary gas G1.

The primary gas G1 is introduced into the housing space S1 in which the heat storage body 10 is housed, from the first flow opening 20a. The primary gas G1 passes through the housing space S1, and is released from the second flow opening 20b. Here, the heat storage body 10 housed in the housing space S1 starts hydration reaction by the primary gas G1. The heat storage body 10 thus starts heat dissipation (heat generation). When the supply of the primary gas G1 continues, the primary gas G1 comes into direct contact with the heat storage body 10, and is released from the second flow opening 20b to the outside as the heat medium G3 heated by the heat storage body 10.

Therefore, with the heat storage and dissipation apparatus 100 according to this embodiment, the primary gas G1 undergoes direct heat exchange with the heat storage body 10, and as a result is released to the outside as the heated heat medium G3. With the heat storage and dissipation apparatus 100 according to this embodiment, the same result is achieved in the case of supplying the primary gas G1 to the second flow opening 20b. In this case, the primary gas G1 is released from the first flow opening 20a to the outside as the heated heat medium G3.

The heat storage and dissipation apparatus 100 according to this embodiment may supply the primary gas G1 to the first flow opening 20a and then supply the secondary gas G2 to the first flow opening 20a. In this embodiment, indoor air is used as the secondary gas G2. In this case, the primary gas G1 functions as a reaction medium for causing reaction of the heat storage body 10, and then is released to the outside. The secondary gas G2 is, instead of the primary gas G1, made into the heat medium G3 heated by the heat storage body 10, and then released to the outside. The heat storage and dissipation apparatus 100 according to this embodiment may also supply the secondary gas G2 while keeping supplying the primary gas G1, thus releasing mixed gas of the primary gas G1 and the secondary gas G2 to the outside as the heated heat medium G3. With the heat storage and dissipation apparatus 100 according to this embodiment, the same result is achieved in the case of supplying the primary gas G1 and the secondary gas G2 to the second flow opening 20b. In this case, the secondary gas G2 or mixed gas of the primary gas G1 and the secondary gas G2 undergoes direct heat exchange with the heat storage body 10, and as a result is released from the first flow opening 20a to the outside as the heated heat medium G3.

Thus, with the heat storage and dissipation apparatus 100 according to this embodiment, because the heat storage body 10 generates heat as a heat source body, at least one of the primary gas G1 and the secondary gas G2 can be brought into direct contact with the heat storage body 10 and used as the heat medium G3 heat-exchanged by the heat storage body 10.

[Heat Storage Mode (Heating Type)]

The heat storage and dissipation apparatus 100 according to this embodiment can restore the heat generation performance of the heat storage body 10, as a result of the heat storage body 10 after hydration reaction, which contains calcium hydroxide ($Ca(OH)_2$), magnesium hydroxide ($Mg(OH)_2$), or the like as a main component, absorbing heat from the outside.

The heat absorbed by the heat storage body 10 is, for example, heat supplied to the first flow opening 20a or the second flow opening 20b. Examples of such heat include heat of a heat medium (heated gas) such as waste heat from a furnace or an internal combustion engine. In the case of using such heated gas, the heat generation performance of the heat storage body 10 is restored by absorbing heat of the heated gas passing through the heat storage body housing portion 20. Hence, in the case of restoring the heat generation performance of the heat storage body 10, too, direct heat exchange with the heat storage body 10 can be performed.

The heat absorbed by the heat storage body 10 may be, for example, heat (energy) converted from electric energy. Such heat is, for example, supplied by a device located adjacent to the heat storage body housing portion 20 and including a heating coil or the like. In the case of using such a device, the heat generation performance of the heat storage body 10 is restored by absorbing heat released from the device.

[Heat Storage Mode (Decompression Type)]

Moreover, in the heat storage mode, the heat generation performance of the heat storage body 10 can be restored by decompressing the housing space S1 of the heat storage body housing portion 20. An example of the method of decompressing the housing space S1 is to seal one of the first flow opening 20a and the second flow opening 20b of the heat storage body housing portion 20 and suck air inside the housing space S1 from the other one of the first flow opening 20a and the second flow opening 20b.

The heat storage and dissipation apparatus 100 according to this embodiment can perform direct heat exchange between the heat medium (the primary gas G1, the secondary gas G2, or mixed gas thereof in this embodiment) and the heat storage body 10. The heat storage and dissipation apparatus 100 according to this embodiment therefore has improved heat exchange efficiency as compared with conventional heat storage and dissipation apparatuses. Moreover, the heat storage and dissipation apparatus 100 according to this embodiment does not need a heat exchange portion such as a heat medium flow path or a fin. The heat storage and dissipation apparatus 100 according to this embodiment can therefore be reduced in size, and has improved productivity, cost, etc.

Figure 2:
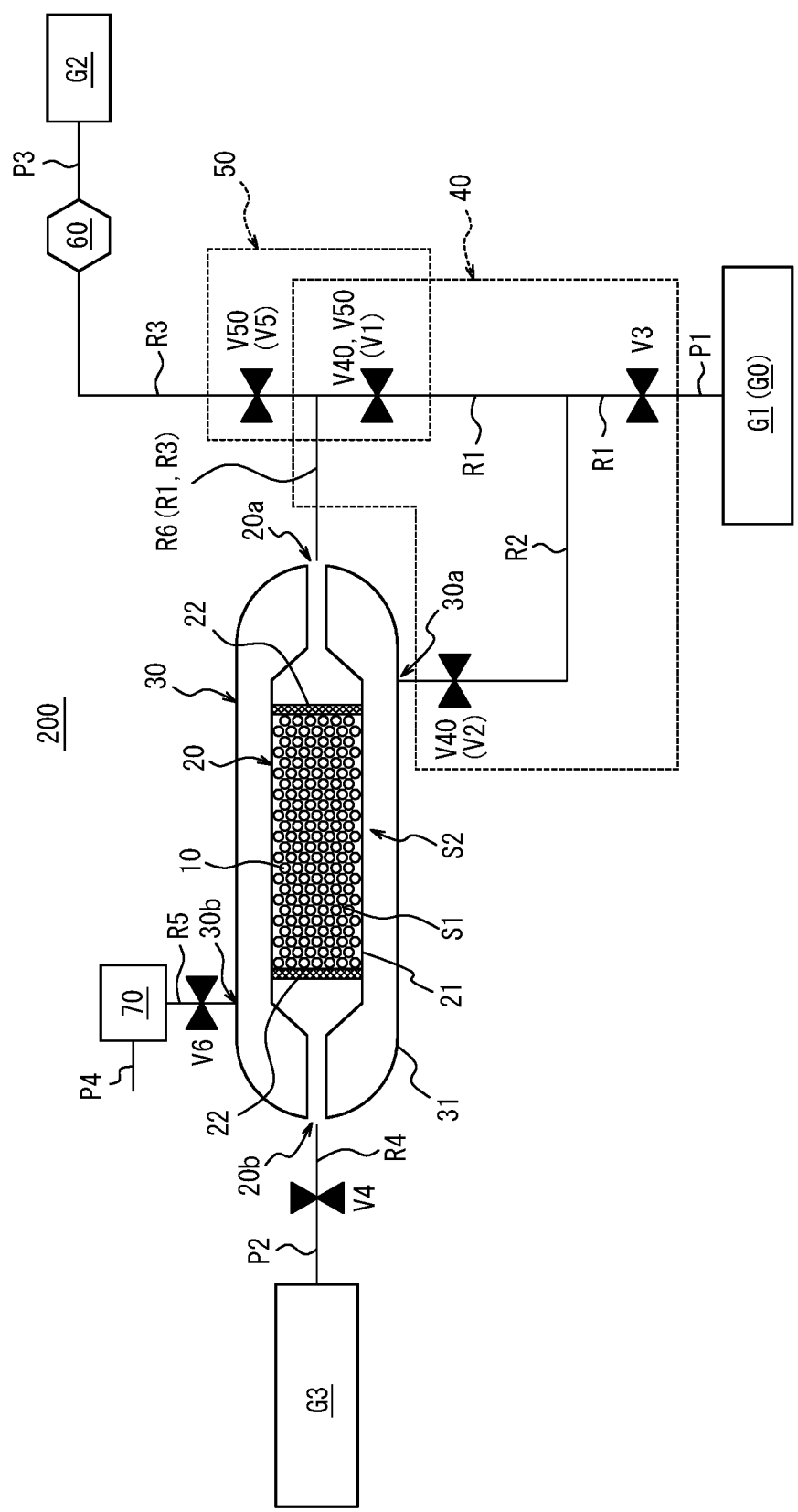
FIG. 2 is a schematic sectional view illustrating a heat storage and dissipation apparatus according to Embodiment 2 of the present disclosure.

FIG. 2 illustrates a heat storage and dissipation apparatus 200 according to Embodiment 2 of the present disclosure. The heat storage and dissipation apparatus 200 has the heat storage body 10 as a heat source body, as in the heat storage and dissipation apparatus 100 in FIG. 1. In the following description, substantially the same parts as those in the heat storage and dissipation apparatus 100 in FIG. 1 are given the same reference signs, and their description is omitted.

The chemical heat storage material forming the heat storage body 10 may generate heat when supplied with gas such as water vapor, as described above. In the case where the temperature in the space in which the heat storage body is housed is low, water molecules $H_2O$ contained in the gas may liquefy in the housing space. If the liquid adheres to the chemical heat storage material, the overall heat generation performance of the chemical heat storage material may decrease because heat is consumed to vaporize the liquid. It is therefore preferable to preheat the heat storage body.

However, for example in the case where the layout in the heat storage and dissipation apparatus is limited, the use of a device including a heating coil or the like to preheat the heat storage body is likely to cause a decrease in the loading quantity of the heat storage body 10 and make it impossible to achieve sufficient heat generation performance.

One object of this embodiment is to provide the heat storage and dissipation apparatus 200 capable of efficiently preventing a decrease in the heat generation performance of the heat storage body 10 without preheating the heat storage body 10 using a device.

The heat storage and dissipation apparatus 200 according to this embodiment further includes a preheating portion 30 that preheats the housing space S1 of the heat storage body housing portion 20, in addition to the structure of the heat storage and dissipation apparatus 100 in FIG. 1. The preheating portion 30 has a preheating gas-filled space S2 located adjacent to the housing space S1 with a partition wall (a cylindrical member 21 of the heat storage body housing portion 20 in this embodiment) therebetween, and a preheating gas inlet 30a communicating with the preheating gas-filled space S2 and capable of introducing a preheating gas G0.

In this embodiment, the preheating gas-filled space S2 is defined by the cylindrical member 21 of the heat storage body housing portion 20 and an outer wall member 31 surrounding the cylindrical member 21 around its axis. In this embodiment, the preheating gas inlet 30a is formed in the outer wall member 31. In this embodiment, for example, the cylindrical member 21 of the heat storage body housing portion 20 is preferably made of a material with high heat conductivity (e.g. stainless steel). In this embodiment, the outer wall member 31 of the preheating portion 30 is preferably made of a material with low heat conductivity (e.g. heat insulator such as ceramic wool) or covered with a lagging material (heat insulator) on its outer surface.

In this embodiment, the preheating portion 30 has a preheating gas outlet 30b communicating with the preheating gas-filled space S2 and capable of discharging the preheating gas G0. The heat storage and dissipation apparatus 200 according to this embodiment further includes a preheating gas discharge path R5 capable of discharging the preheating gas G0 from the preheating gas outlet 30b of the preheating portion 30, a drain chamber 70 capable of housing the preheating gas G0 from the preheating gas discharge path R5, a drain port P4 capable of discharging liquid resulting from liquefaction in the drain chamber 70, and a switching valve (on-off valve) V6 that opens and closes the preheating gas discharge path R5.

In the heat storage and dissipation apparatus 200 according to this embodiment, in a state in which the preheating gas discharge path R5 is closed or opened by controlling the switching valve V6, the preheating gas G0 is introduced into the preheating gas-filled space S2 of the preheating portion 30 from the preheating gas inlet 30a. Consequently, the heat storage body 10 can be preheated by heat dissipation of the preheating gas G0. In this case, as a result of the housing space S1 of the heat storage body housing portion 20 being heated together with the heat storage body 10, liquefaction of water molecules $H_2O$ contained in the primary gas G1 in the housing space S1 can be prevented. Thus, the heat storage and dissipation apparatus 200 according to this embodiment can efficiently prevent a decrease in the heat generation performance of the heat storage body 10 by using the preheating gas G0, without preheating the heat storage body 10 using a device such as a heating coil.

In the heat storage and dissipation apparatus 200 according to this embodiment, the primary gas G1 and the preheating gas G0 may be the same gas.

In this embodiment, factory steam is used as the primary gas G1. The temperature of factory steam is typically 80 (° C.) to 200 (° C.). By using such gas heated beforehand not only as the primary gas G1 but also as the preheating gas G0, the heat storage body 10 can be efficiently preheated using the same gas.

The heat storage and dissipation apparatus 200 according to this embodiment uses the same gas as the primary gas G1 and the preheating gas G0. The heat storage and dissipation apparatus 200 accordingly further includes a same gas supply portion 40 capable of supplying the same gas to the first flow opening 20a of the heat storage body housing portion 20 and the preheating gas inlet 30a of the preheating portion 30.

In this embodiment, the same gas supply portion 40 can supply the same primary gas G1 from the same supply source to the first flow opening 20a of the heat storage body housing portion 20 and the preheating gas inlet 30a of the preheating portion 30, as the same gas. Its detailed structure will be described later. In this case, the same one gas can be used as the above-described same gas, so that the heat storage body 10 can be preheated efficiently.

In this embodiment, the same gas supply portion 40 uses the primary gas G1 from the same supply source as the same gas, as described above.

In detail, the same gas supply portion 40 in FIG. 2 includes a primary gas flow path R1 capable of supplying the primary gas G1 to the first flow opening 20a of the heat storage body housing portion 20, a preheating gas flow path R2 branching off from the primary gas flow path R1 and capable of supplying the primary gas G1 to the preheating gas inlet 30a of the preheating portion 30, and at least one switching valve V40 causing at least one of the primary gas flow path R1 and the preheating gas flow path R2 to communicate with corresponding at least one of the first flow opening 20a of the heat storage body housing portion 20 and the preheating gas inlet 30a of the preheating portion 30. In this case, the same supply source of the primary gas G1 can be used, and also the supply of the primary gas G1 from the same supply source can be easily controlled by simple operation of merely controlling the switching valve V40.

In particular, in this embodiment, the switching valve V40 is provided in each of the primary gas flow path R1 and the preheating gas flow path R2. In this embodiment, the switching valve V40 is comprised of two on-off valves V1 and V2. The on-off valve V1 is located in the primary gas flow path R1. The on-off valve V1 can open and close the primary gas flow path R1 by manual operation, electric control, air control, or the like. The on-off valve V2 is located in the preheating gas flow path R2. The on-off valve V2 can open and close the preheating gas flow path R2 by manual operation, electric control, air control, or the like. In this embodiment, the switching valve V40 is provided in each of the primary gas flow path R1 and the preheating gas flow path R2, so that the supply of the primary gas G1 to the heat storage body housing portion 20 and the supply of the primary gas G1 to the preheating portion 30 can be performed independently of each other.

The switching valve V40 may be a plurality of ball valves, gate valves, or the like subjected to manual operation, electric control, air control, or the like, or one electric control valve. The electric control valve includes, for example, one input port, two output ports, and one plunger electrically controllable by an electromagnetic solenoid or the like. By operating the plunger in the electric control valve, switching between the respective routes from the input port to the two output ports can be performed, and also the respective routes from the input port to the two output ports can be closed. In this case, for example, by providing one electric control valve at the branch part of the primary gas flow path R1 and the preheating gas flow path R2 as the switching valve V40, the supply of the primary gas G1 to the heat storage body housing portion 20 and the supply of the primary gas G1 to the preheating portion 30 can be performed using one switching valve V40.

Reference sign V3 is an optional switching valve (on-off valve) accessorily provided in the same gas supply portion 40. In this embodiment, the on-off valve V3 is located in the primary gas flow path R1. Specifically, the on-off valve V3 is located on the upstream side of the branch part of the primary gas flow path R1 and the preheating gas flow path R2 relative to the on-off valve V1. The on-off valve V3 can open and close the primary gas flow path R1 by manual operation, electric control, air control, or the like. In this embodiment, the on-off valve V3 is optionally provided in the same gas supply portion 40. In this embodiment, for example, the on-off valve V3 functions as a fail-safe on-off valve in the event of a failure of the switching valve V40.

As a modification to the structure in FIG. 2, the same gas supply portion 40 can use two primary gases G1 of different supply sources, as the same gas. That is, two primary gases G1 of different supply sources can be supplied, as the same gas, to at least one of the first flow opening 20a of the heat storage body housing portion 20 and the preheating gas inlet 30a of the preheating portion 30. Its detailed structure will be described later. In this case, too, the same one gas can be used as the same gas, so that the heat storage body 10 can be preheated efficiently.

In this modification, the same gas supply portion 40 uses two primary gases G1 of different supply sources as the same gas. In this case, the primary gases G1 are supplied from the two supply sources independently of each other. Herein, "the same gas" includes gases that differ in temperature or purity. For example, in the case of the same gases that differ in purity, a gas higher in purity may be supplied to the first flow opening 20a of the heat storage body housing portion 20, and a gas lower in purity to the preheating gas inlet 30a of the preheating portion 30. In the case of the same gases that differ in temperature, a gas higher in temperature may be supplied to the preheating gas inlet 30a of the preheating portion 30, and a gas lower in temperature to the first flow opening 20a of the heat storage body housing portion 20.

In detail, in the same gas supply portion 40 according to this modification, for example, the primary gas flow path R1 and the preheating gas flow path R2 are formed as flow paths independent of each other. For example, the primary gas flow path R1 is connected to one supply source (not illustrated), and is supplied with the primary gas G1 from the one supply source. The preheating gas flow path R2 is connected to the other supply source (not illustrated), and is supplied with the preheating gas G0 (primary gas G1) from the other supply source. When supplying the primary gas G1 to the heat storage body housing portion 20, the on-off valve V1 of the primary gas flow path R1 is opened. When supplying the preheating gas G0 (primary gas G1) to the preheating portion 30, the on-off valve V2 of the preheating gas flow path R2 is opened. Thus, the supply of the primary gas G1 to the heat storage body housing portion 20 and the supply of the preheating gas G0 (primary gas G1) to the preheating portion 30 can be performed independently of each other, as in the embodiment in FIG. 2. In the case where two primary gases G1 of different supply sources are used as the same gas, too, the supply of the primary gas G1 can be easily controlled by simple operation of merely controlling the switching valve V40.

As mentioned earlier, water vapor can be used as the primary gas G1.

However, because water vapor has high specific heat and is hard to be heated, for example in the case of using water vapor as the primary gas G1, it is not easy to output the primary gas G1 at high temperature as the heated heat medium G3.

One object of this embodiment is to provide the heat storage and dissipation apparatus 200 capable of releasing different heat media.

The heat storage and dissipation apparatus 200 according to this embodiment further includes a primary gas supply change portion 50 capable of supplying at least one of the primary gas G1 and the secondary gas G2 different from the primary gas G1 to the first flow opening 20a of the heat storage body housing portion 20. In this case, as a result of at least one of the primary gas G1 and the secondary gas G2 being supplied to the first flow opening 20a of the heat storage body housing portion 20, the primary gas G1, the secondary gas G2, or mixed gas thereof can be released as a different heat medium G3.

In the heat storage and dissipation apparatus 200 according to this embodiment, the primary gas supply change portion 50 includes the primary gas flow path R1 capable of supplying the primary gas G1 to the first flow opening 20a of the heat storage body housing portion 20, a secondary gas flow path R3 meeting the primary gas flow path R1 and capable of supplying the secondary gas G2 to the first flow opening 20a of the heat storage body housing portion 20, and at least one switching valve V50 causing at least one of the primary gas flow path R1 and the secondary gas flow path R3 to communicate with the first flow opening 20a of the heat storage body housing portion 20. In this case, the supply of the primary gas G1 and the secondary gas G2 can be easily controlled by simple operation of merely controlling the switching valve V50.

In particular, in this embodiment, the switching valve V50 is provided in each of the primary gas flow path R1 and the secondary gas flow path R3. In this embodiment, the primary gas flow path R1 is in common with that of the same gas supply portion 40. In this embodiment, the switching valve V50 is comprised of two on-off valves V1 and V5. In this embodiment, the on-off valve V1 is in common with that of the same gas supply portion 40. The on-off valve V5 is located in the secondary gas flow path R3. The on-off valve V5 opens and closes the secondary gas flow path R3 by manual operation, electric control, air control, or the like. In this case, the switching valve V50 is provided in each of the primary gas flow path R1 and the secondary gas flow path R3, so that the supply of the primary gas G1 to the heat storage body housing portion 20 and the supply of the secondary gas G2 to the heat storage body housing portion 20 can be performed independently of each other. In this embodiment, a common one path R6 is formed between the part at which the secondary gas flow path R3 meets the primary gas flow path R1 and the first flow opening 20a of the heat storage body housing portion 20.

The switching valve V50 may be a plurality of ball valves, gate valves, or the like subjected to manual operation, electric control, or air control, or one electric control valve, as with the switching valve V40. The electric control valve includes, for example, one input port, two output ports, and one plunger electrically controllable by an electromagnetic solenoid or the like, as with the switching valve V40. By operating the plunger in the electric control valve, switching between the respective routes from the input port to the two output ports can be performed, and also the respective routes from the input port to the two output ports can be closed. In the case where the switching valve V50 is one electric control valve, for example, the switching valve V50 may be located at the meeting part of the primary gas flow path R1 and the secondary gas flow path R3. In this case, the supply of the primary gas G1 to the heat storage body housing portion 20 and the supply of the secondary gas G2 to the heat storage body housing portion 20 can be performed by one switching valve V50.

The chemical heat storage material using metal oxide or the like may be carboxylated by carbon dioxide ($CO_2$) contained in gas supplied to the chemical heat storage material. In such a case, for example, when magnesium oxide (MgO) reacts with carbon dioxide ($CO_2$), it changes to magnesium carbonate ($MgCO_3$). When calcium oxide (CaO) reacts with carbon dioxide ($CO_2$), it changes to calcium carbonate ($CaCO_3$). When magnesium hydroxide ($Mg(OH)_2$) reacts with carbon dioxide ($CO_2$), it changes to magnesium carbonate ($MgCO_3$). When calcium hydroxide ($Ca(OH)_2$) reacts with carbon dioxide ($CO_2$), it changes to calcium carbonate ($CaCO_3$).

Such carboxylation of the chemical heat storage material may hinder reversible reaction of heat dissipation and heat storage, and cause a decrease in the heat generation performance and heat storage performance of the heat storage body 10.

One object of this embodiment is to provide the heat storage and dissipation apparatus 200 capable of maintaining its heat generation performance and heat storage performance for a long time.

The heat storage and dissipation apparatus 200 according to this embodiment further includes a secondary gas decarboxylation treatment portion 60 that subjects the secondary gas G2 to decarboxylation treatment.

In this embodiment, the secondary gas decarboxylation treatment portion 60 is located in the secondary gas flow path R3. Specifically, the secondary gas decarboxylation treatment portion 60 is located on the upstream side (the side on which the secondary gas G2 is supplied in this example) relative to the switching valve V50 (on-off valve V5) of the secondary gas flow path R3. In this embodiment, the secondary gas decarboxylation treatment portion 60 allows the secondary gas G2 to pass through. When the secondary gas G2 passes through the secondary gas decarboxylation treatment portion 60, decarboxylation treatment using chemisorption, lithium silicate, or the like is performed, to remove carbon dioxide ($CO_2$) in the secondary gas G2. Once carbon dioxide ($CO_2$) contained in the secondary gas G2 has been removed, carbon dioxide ($CO_2$) will not combine with metal oxide or the like contained in the heat storage body 10. This prevents, for example, such a phenomenon that calcium oxide (CaO) contained in the heat storage body 10 changes to calcium carbonate ($CaCO_3$), and heat generation performance cannot be fully restored when heating the reacted heat storage body 10. Thus, the heat storage and dissipation apparatus 200 according to this embodiment prevents carboxylation of the heat storage body 10 caused by the secondary gas G2, so that the heat generation performance and heat storage performance of the heat storage body 10 can be maintained for a long time.

In this embodiment, the primary gas G1 is used only to cause the heat storage body 10 to generate heat, as described later. Accordingly, the influence of carboxylation caused by the primary gas G1 is likely to be not as significant as the influence of carboxylation caused by the secondary gas G2 which is supplied continuously. In view of the influence of carboxylation caused by the primary gas G1, however, the heat storage and dissipation apparatus 200 according to this embodiment preferably further includes a primary gas decarboxylation treatment portion (not illustrated) that subjects the primary gas G1 to decarboxylation treatment, as a modification.

In this modification, the primary gas decarboxylation treatment portion may have the same structure as the secondary gas decarboxylation treatment portion 60. For example, the primary gas decarboxylation treatment portion may be located in the primary gas flow path R1. Specifically, the primary gas decarboxylation treatment portion is preferably located between the branch part of the primary gas flow path R1 and the preheating gas flow path R2 and the meeting part of the secondary gas flow path R3 and the primary gas flow path R1. When the primary gas G1 passes through the primary gas decarboxylation treatment portion, decarboxylation treatment using chemisorption or the like is performed, to remove carbon dioxide ($CO_2$) in the primary gas G1. Once carbon dioxide ($CO_2$) contained in the primary gas G1 has been removed, carbon dioxide ($CO_2$) will not combine with metal oxide or the like contained in the heat storage body 10, as in the case of the secondary gas decarboxylation treatment portion 60. This further prevents, for example, such a phenomenon that calcium oxide (CaO) contained in the heat storage body 10 changes to calcium carbonate ($CaCO_3$), and heat generation performance cannot be fully restored when heating the reacted heat storage body 10. Thus, adding the primary gas decarboxylation treatment portion to the heat storage and dissipation apparatus 200 according to this embodiment prevents carboxylation of the heat storage body 10 caused by the primary gas G1, so that the heat generation performance and heat storage performance of the heat storage body 10 can be maintained for a longer time.

The heat storage and dissipation apparatus 200 according to this embodiment further includes a first port P1 capable of introducing the primary gas G1, a heat medium flow path R4 capable of flowing the heat medium G3 from the second flow opening 20b of the heat storage body housing portion 20, a second port P2 capable of releasing the heat medium G3, and a third port P3 capable of introducing the secondary gas G2, as illustrated in FIG. 2.

In this embodiment, the first port P1 is connected to the primary gas flow path R1, and can be connected to, for example, a factory steam pipe (not illustrated). In this embodiment, the second port P2 is connected to the heat medium flow path R4, and can be connected to, for example, a high-temperature gas supply pipe (not illustrated) in the factory. The third port P3 is connected to the secondary gas flow path R3, and can be connected to, for example, an air compressor (not illustrated) in the factory.

The heat storage and dissipation apparatus 200 according to this embodiment further includes a switching valve (on-off valve) V4 in the heat medium flow path R4, as illustrated in FIG. 2. The on-off valve V4 can open and close the heat medium flow path R4 by manual operation, electric control, air control, or the like.

Operations of the heat storage and dissipation apparatus 200 according to this embodiment will be described below, with reference to FIGS. 2 to 8. In this embodiment, all on-off valves (V1 to V6) are closed in the heat storage and dissipation apparatus 200 in its initial state illustrated in FIG. 2.

[Heat Dissipation Mode]

The heat storage and dissipation apparatus 200 can release the heated heat medium G3, as with the heat storage and dissipation apparatus 100 in FIG. 1.

<Preheating Step>

Figure 3:
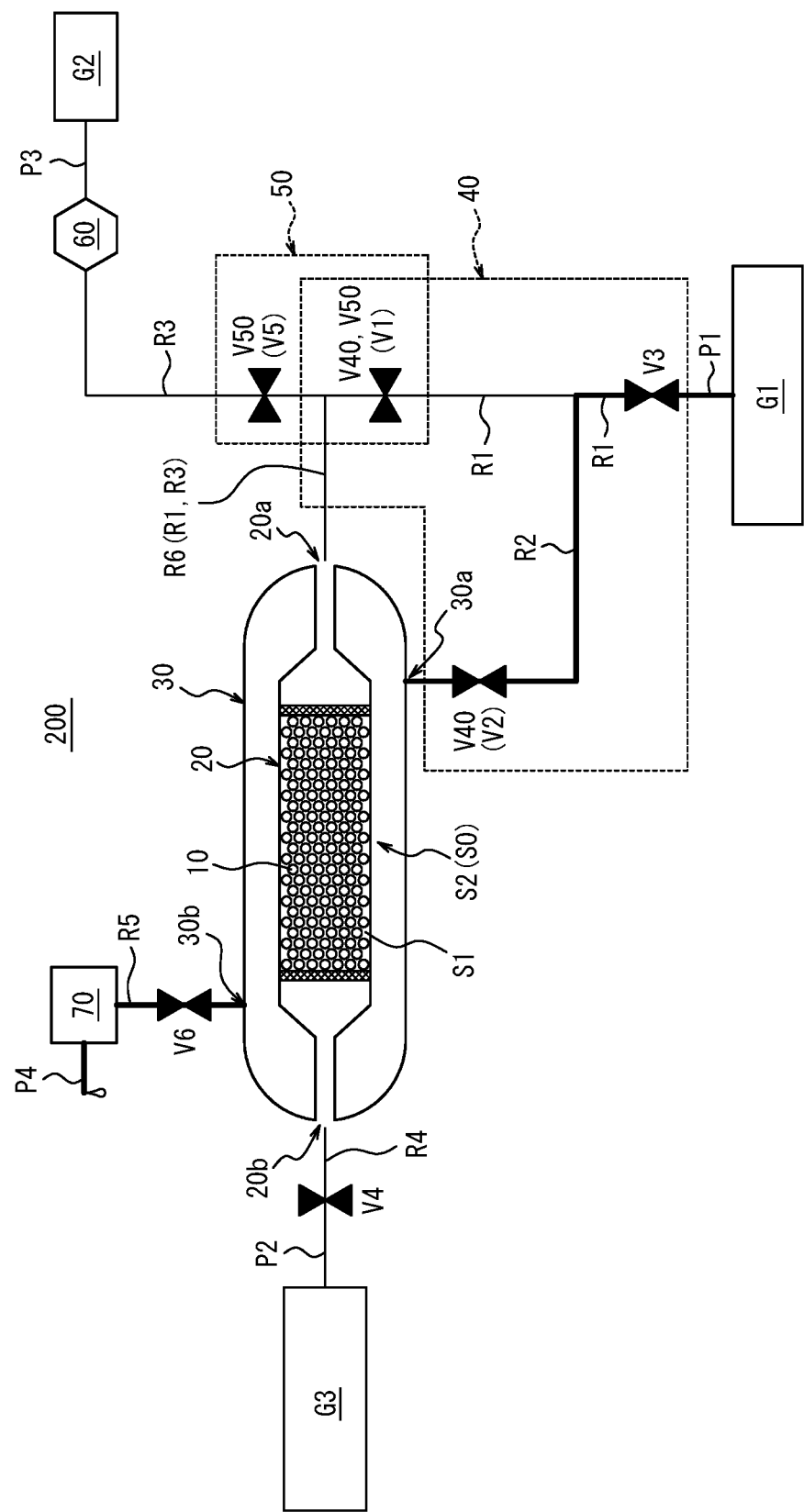
FIG. 3 is a schematic sectional view illustrating a preheating step in an example of a heat dissipation mode in the case of using the heat storage and dissipation apparatus in FIG. 2.

In the heat dissipation mode according to this embodiment, a preheating step is performed first. FIG. 3 illustrates the preheating step in the heat dissipation mode. In the preheating step according to this embodiment, the primary gas G1 is supplied to the preheating gas-filled space S2 of the preheating portion 30 as the preheating gas G0. In this way, the housing space S1 of the heat storage body housing portion 20 can be preheated together with the heat storage body 10, without using a device such as a heating coil.

Specifically, the preheating gas flow path R2 is opened to cause the first port P1 and the preheating gas inlet 30a of the preheating portion 30 to communicate with each other. Thus, the primary gas G1 introduced from the first port P1 can be supplied to the preheating gas-filled space S2. In detail, the on-off valve V2 and the on-off valve V3 in the same gas supply portion 40 are opened. In this case, it is preferable that the on-off valve V2 is opened after the on-off valve V3 is opened.

Further, in the preheating step according to this embodiment, the preheating gas G0 (primary gas G1) loaded into the preheating gas-filled space S2 of the preheating portion 30 can be released to the drain chamber 70. The primary gas G1 excessively loaded into the preheating gas-filled space S2 can thus be released and liquefied to be discarded or recovered. Moreover, by releasing the primary gas G1 in the preheating gas-filled space S2 to the drain chamber 70, the temperature in the preheating gas-filled space S2 can be adjusted so as not to increase excessively.

Specifically, the preheating gas discharge path R5 is opened to cause the preheating gas outlet 30b of the preheating portion 30 and the drain chamber 70 to communicate with each other. Thus, the preheating gas G0 (primary gas G1) in the preheating gas-filled space S2 can be released to the drain chamber 70. In detail, the switching valve V6 in the preheating gas discharge path R5 is opened, as illustrated in FIG. 3.

The end of the preheating step can be determined, for example, based on whether a predetermined time TM1 has elapsed from the start of the supply of the primary gas G1. The predetermined time TM1 may be set beforehand depending on the types, amounts, etc. of the heat storage body 10 and the primary gas G1. The predetermined time TM1 may be adjusted as appropriate depending on the detailed structure of the heat storage and dissipation apparatus such as the size of the housing space S1 of the heat storage body housing portion 20, the size of the heat storage and dissipation apparatus, and the like. As a specific example, the predetermined time TM1 may be in a range of 0 (sec) to 3600 (sec). The end of the preheating step can be determined, for example, based on whether the temperature in the housing space S1 of the heat storage body housing portion 20, the temperature in the preheating gas-filled space S2 of the preheating portion 30, or the surrounding temperature of the heat storage body housing portion 20 (hereafter also referred to as "temperature TP of the heat storage body 10, etc.") exceeds a predetermined temperature TP1. The predetermined temperature TP1 can equally be set depending on the types, amounts, etc. of the heat storage body 10 and the primary gas G1 (preheating gas G0). For example, the predetermined temperature TP1 may be in a range of 120 (° C.) to 300 (° C.).

<Reaction Step (Primary Heat Dissipation Step)>

Figure 4:
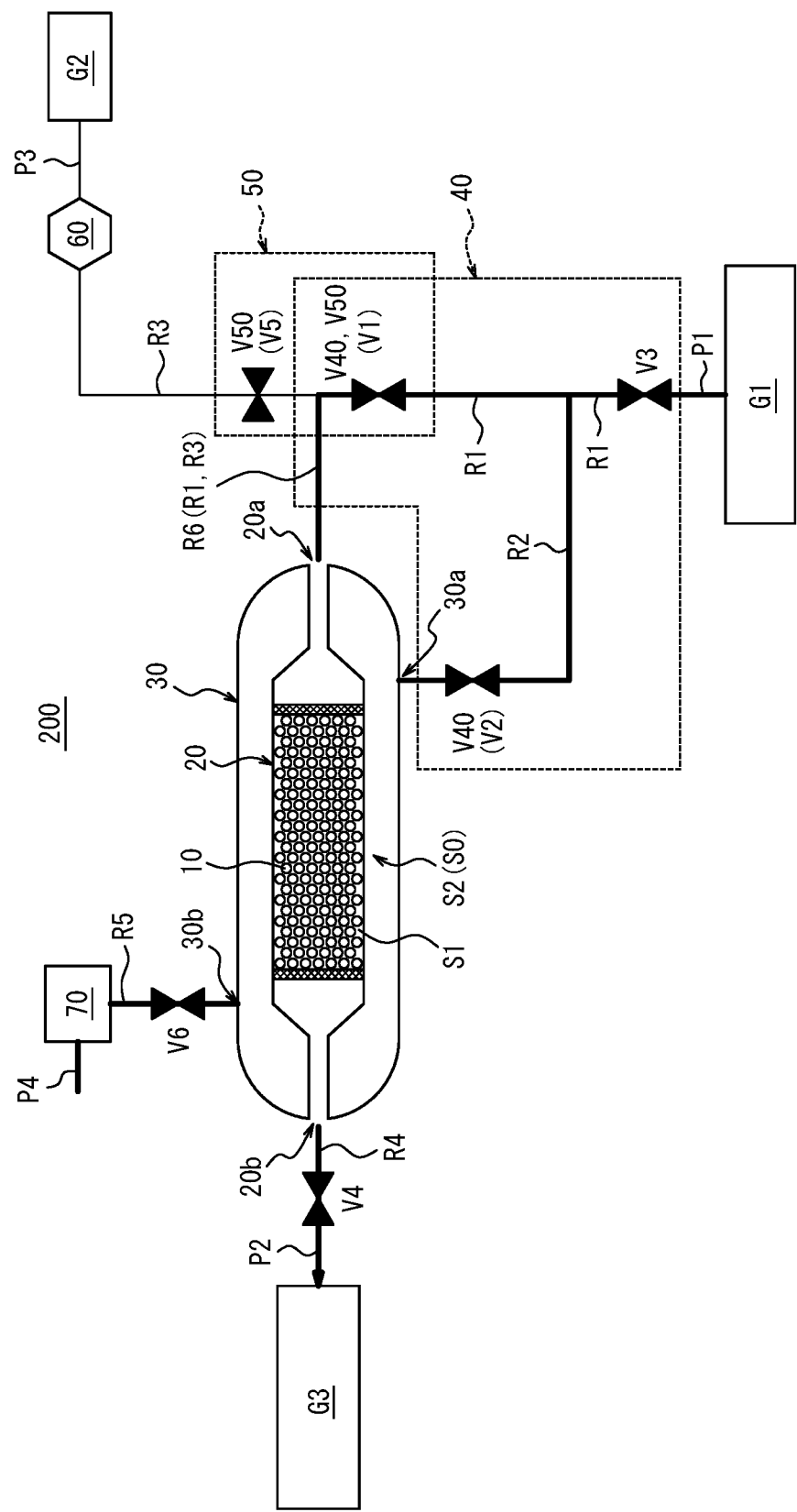
FIG. 4 is a schematic sectional view illustrating a reaction step (primary heat dissipation step) in the heat dissipation mode in the heat storage and dissipation apparatus in FIG. 2.

After the preheating step ends, a reaction step is performed. FIG. 4 illustrates the reaction step in the heat dissipation mode. In the reaction step according to this embodiment, the primary gas G1 is supplied to the housing space S1 of the heat storage body housing portion 20 in which the heat storage body 10 is housed. This causes the heat storage body 10 to react with the primary gas G1 and start heat dissipation (heat generation).

Specifically, the primary gas flow path R1 is opened to cause the first port P1 and the first flow opening 20a of the heat storage body housing portion 20 to communicate with each other. Thus, the primary gas G1 introduced from the first port P1 can be supplied to the housing space S1 of the heat storage body housing portion 20. In detail, after the end of the preheating step, not only the on-off valves V2 and V3 but also the on-off valve V1 in the same gas supply portion 40 is opened.

Further, in the reaction step according to this embodiment, the primary gas G1 supplied to the housing space S1 of the heat storage body housing portion 20 is released from the second flow opening 20b. This enables heat generation of the heat storage body 10 simply by supplying the primary gas G1 to the first flow opening 20a of the heat storage body housing portion 20 without adjusting the amount of the primary gas G1 from the first port P1.

Specifically, the heat medium flow path R4 is opened to cause the second flow opening 20b of the heat storage body housing portion 20 and the second port P2 to communicate with each other. Thus, the primary gas G1 supplied to the housing space S1 of the heat storage body housing portion 20 can be released to the second port P2. In detail, the on-off valve V4 of the heat medium flow path R4 is opened. In this case, it is preferable that the on-off valve V4 is opened before the on-off valve V1 of the same gas supply portion 40.

As illustrated in FIG. 4, the reaction step according to this embodiment may be continued to keep supplying the primary gas G1 into the housing space S1 of the heat storage body housing portion 20. In this case, the reaction step according to this embodiment directly becomes a primary heat dissipation step. In the primary heat dissipation step, the primary gas G1 can be brought into direct contact with the heat storage body 10, and released to the second port P2 as the heat medium G3 heated by the heat storage body 10. In this case, the on-off valve V2 in the same gas supply portion 40 may remain opened, or may be closed.

<Secondary Heat Dissipation Step (Heat Dissipation Step)>

Figure 5:
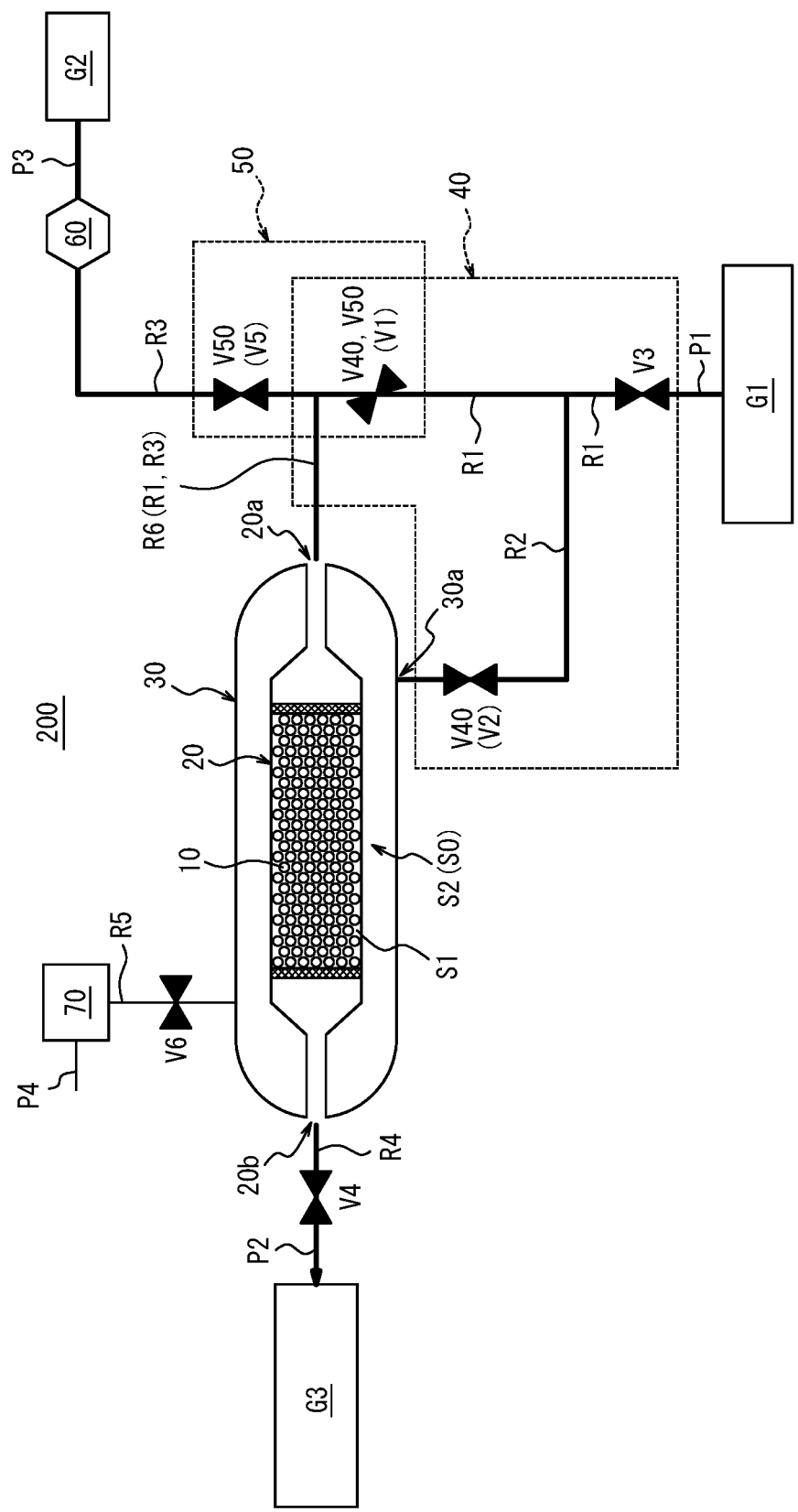
FIG. 5 is a schematic sectional view illustrating a state of transition from the reaction step to a (secondary) heat dissipation step in the heat dissipation mode in the heat storage and dissipation apparatus in FIG. 2.

After the reaction step ends, a heat dissipation step is performed. FIG. 5 illustrates a state of transition from the reaction step to the heat dissipation step. In the heat dissipation step according to this embodiment, first, the secondary gas G2 is supplied to the housing space S1 of the heat storage body housing portion 20 while reducing the primary gas G1 supplied to the housing space S1, as illustrated in FIG. 5. Consequently, the secondary gas G2 is released to the second flow opening 20b of the heat storage body housing portion 20 as the heat medium G3 while pushing the primary gas G1 out of the housing space S1 of the heat storage body housing portion 20.

Specifically, while closing the primary gas flow path R1 (the primary gas flow path R1 other than the common one path R6), the third port P3 and the first flow opening 20a of the heat storage body housing portion 20 are caused to communicate with each other. Thus, the secondary gas G2 introduced from the third port P3 can be supplied to the housing space S1 of the heat storage body housing portion 20, while reducing the primary gas G1 introduced from the first port P1. In detail, while closing the on-off valve V1 of the primary gas supply change portion 50 (same gas supply portion 40), the on-off valve V5 of the primary gas supply change portion 50 is opened. In this case, it is preferable that the on-off valve V5 is opened before the on-off valve V1 is closed.

The start of the secondary heat dissipation step (the end of the reaction step) can be determined, for example, based on whether a predetermined time TM2 has elapsed from the start of the supply of the primary gas G1.

In this embodiment, for example, the supply of the primary gas G1 may be performed until the amount of water molecules $H_2O$ supplied to the heat storage body 10 reaches a reference amount that is the amount of water molecules $H_2O$ necessary for hydration reaction in the heat storage body 10 reaches criticality. Herein, "criticality" denotes the "time at which heat dissipation in the "heat storage body 10" reaches its maximum". As a specific example, the supply of the primary gas G1 is performed until the predetermined time TM2 has elapsed from the start of the supply of the primary gas G1. In this embodiment, for example, the predetermined time TM2 is a time ta required for the supply of the primary gas G1 necessary for hydration reaction in the heat storage body 10 to reach criticality. The time ta may be set beforehand depending on the types, amounts, etc. of the heat storage body 10 and the primary gas G1. The predetermined time TM2 may be longer than the time ta, or shorter than the time ta. The predetermined time TM2 may be adjusted as appropriate depending on the detailed structure of the heat storage and dissipation apparatus such as the size of the housing space S1 of the heat storage body housing portion 20, the size of the heat storage and dissipation apparatus, and the like. As a specific example, the predetermined time TM2 may be in a range of 0 (sec) to 3600 (sec).

After the predetermined time TM2 elapses, the on-off valve V1 of the primary gas supply change portion 50 is closed, and the on-off valve V5 of the primary gas supply change portion 50 is opened. Consequently, the secondary gas G2 passes through the housing space S1 of the heat storage body housing portion 20 in which the heat storage body 10 is housed, while pushing the primary gas G1 out. By continuing the supply of the secondary gas G2, the secondary gas G2 is brought into direct contact with the heat storage body 10, and released to the second port P2 as the heat medium G3 heated by the heat storage body 10.

The start of the secondary heat dissipation step (the end of the reaction step) can be determined, for example, based on whether the temperature TP of the heat storage body 10, etc. exceeds the predetermined temperature TP2.

As a specific example, the supply of the primary gas G1 may be performed until the temperature TP of the heat storage body 10, etc. reaches the predetermined temperature TP2. In this embodiment, the temperature TP of the heat storage body 10, etc. can be detected using a temperature measurement device such as a temperature sensor. In this embodiment, for example, the predetermined temperature TP2 is a critical temperature T10*max* when the heat storage body 10 generates heat. The critical temperature T10*max* may be set beforehand depending on the types, amounts, etc. of the heat storage body 10 and the primary gas G1. The predetermined temperature TP2 may be higher than the critical temperature T10*max*, or lower than the critical temperature T10*max*. For example, the predetermined temperature TP2 may be 500 (° C.).

After the predetermined temperature TP2 is reached, the on-off valve V1 of the primary gas supply change portion 50 is closed, and the on-off valve V5 of the primary gas supply change portion 50 is opened. Consequently, the secondary gas G2 starts to pass through the housing space S1 of the heat storage body housing portion 20 in which the heat storage body 10 is housed, while pushing the primary gas G1 out. By continuing the supply of the secondary gas G2, the secondary gas G2 is brought into direct contact with the heat storage body 10, and released to the second port P2 as the heat medium G3 heated by the heat storage body 10.

Figure 6:
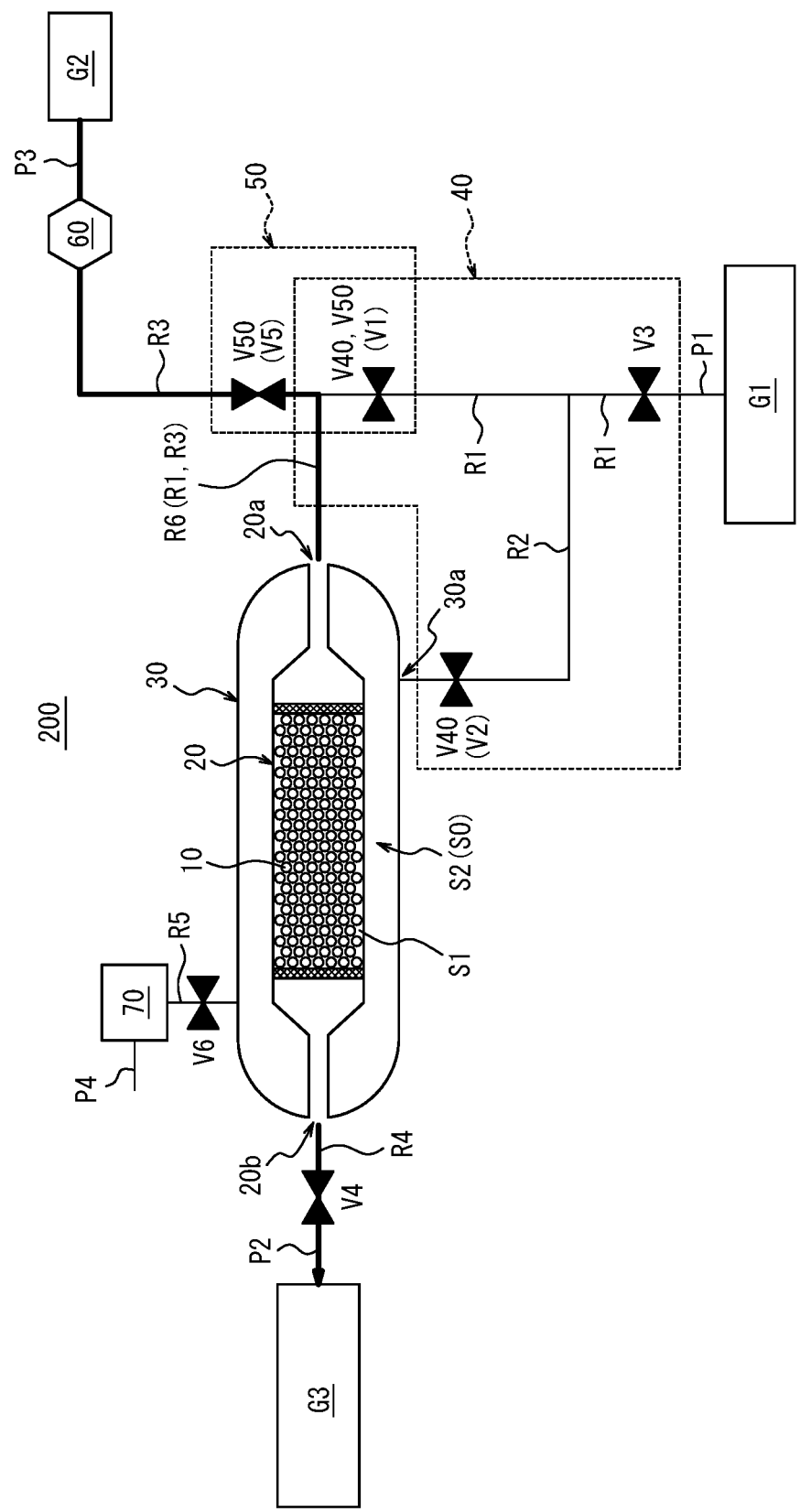
FIG. 6 is a schematic sectional view illustrating the (secondary) heat dissipation step in the heat dissipation mode in the heat storage and dissipation apparatus in FIG. 2.

FIG. 6 illustrates a state in which the gas supplied to the first flow opening 20a of the heat storage body housing portion 20 has been completely changed from the primary gas G1 to the secondary gas G2. In this embodiment, the on-off valve V1 of the primary gas supply change portion 50 is fully closed, and only the secondary gas G2 is supplied to the first flow opening 20a of the heat storage body housing portion 20. Hence, the secondary gas G2 heated by the heat storage body 10 is released to the second port P2 as the heated heat medium G3. In this embodiment, the on-off valves V2 and V3 of the same gas supply portion 40 are closed. Alternatively, the on-off valves V2 and V3 of the same gas supply portion 40 may be left opened.

Thus, in the heat storage and dissipation apparatus 200 according to this embodiment, reaction in the heat storage body 10 is started by the primary gas G1 supplied from the first flow opening 20a of the heat storage body housing portion 20, as a result of which the heat storage body 10 generates heat as a heat source body, as in the heat storage and dissipation apparatus 100 in FIG. 1. Moreover, in the heat storage and dissipation apparatus 200 according to this embodiment, the primary gas G1 supplied to the first flow opening 20a of the heat storage body housing portion 20 can be switched to the secondary gas G2, as illustrated in FIG. 6. Hence, the secondary gas G2 released from the second flow opening 20b of the heat storage body housing portion 20 can be used as the heat medium G3 heat-exchanged by the heat storage body 10. Furthermore, in the heat storage and dissipation apparatus 200 according to this embodiment, it is also possible to keep supplying the primary gas G1 from the first flow opening 20a of the heat storage body housing portion 20 without switching the primary gas G1 to the secondary gas G2. In this case, the primary gas G1 released from the second flow opening 20b of the heat storage body housing portion 20 can be used as the heat medium G3 heat-exchanged by the heat storage body 10.

[Heat Storage Mode (Heating Type)]

The heat storage and dissipation apparatus 200 according to this embodiment can restore the heat generation performance of the heat storage body 10 by absorbing heat from the outside. In this embodiment, heat is supplied to the first flow opening 20a or the second flow opening 20b of the heat storage body housing portion 20, as the heat absorbed by the heat storage body 10. Examples of such heat include heat of heated gas (heat medium) G4 such as waste heat from a furnace or an internal combustion engine.

Figure 7:
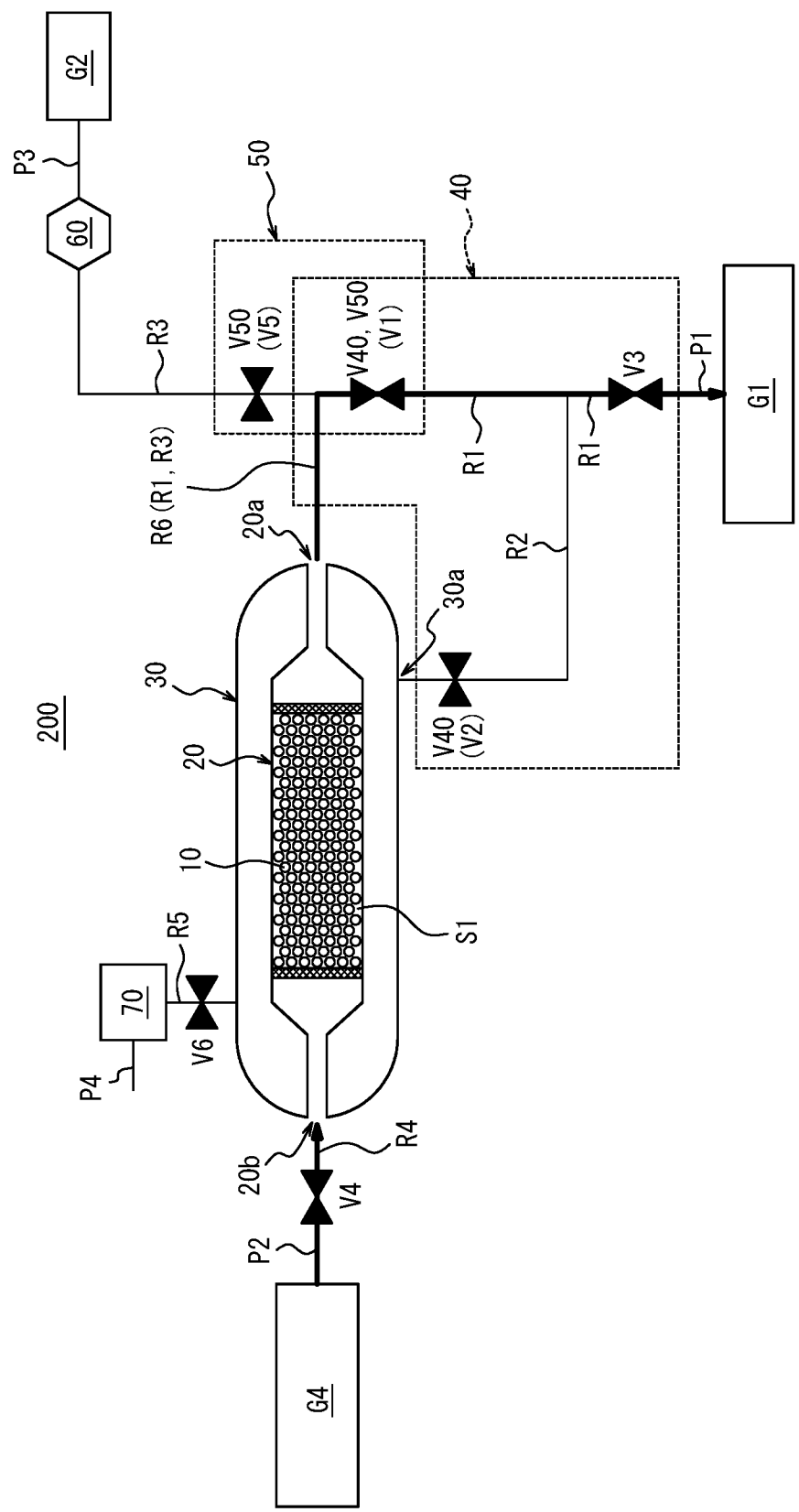
FIG. 7 is a schematic sectional view illustrating an example of a heat storage mode in the heat storage and dissipation apparatus in FIG. 2.

FIG. 7 illustrates an example of the heat storage mode of the heat storage and dissipation apparatus 200 according to this embodiment. In the heat storage and dissipation apparatus 200 according to this embodiment, the heat storage body 10 after the reaction end is heated to restore the heat generation performance of the heat storage body 10.

In the heat storage mode according to this embodiment, the heated gas G4 is supplied from the second port P2 to the second flow opening 20b of the heat storage body housing portion 20. The heat of the heated gas G4 passing through the heat storage body housing portion 20 is absorbed by the heat storage body 10, as a result of which the heat generation performance of the heat storage body 10 is restored.

Specifically, the heat medium flow path R4 is opened to cause the second flow opening 20b of the heat storage body housing portion 20 and the second port P2 to communicate with each other. Thus, the heated gas G4 introduced from the second port P2 can be supplied to the housing space S1 of the heat storage body housing portion 20. In detail, after the end of the heat dissipation mode, for example, the second port P2 is connected to the factory steam pipe (not illustrated). In this case, it is preferable that the on-off valve V4 of the heat medium flow path R4 is closed. Following this, the on-off valve V4 of the heat medium flow path R4 is opened.

Further, in the heat storage mode according to this embodiment, the heated gas G4 supplied to the housing space S1 of the heat storage body housing portion 20 is released to the primary gas flow path R1.

Specifically, the secondary gas flow path R3 is closed, and the primary gas flow path R1 is opened, to cause the first flow opening 20a of the heat storage body housing portion 20 and the first port P1 to communicate with each other. This enables restoration of the heat storage body 10 simply by supplying the heated gas G4 to the second flow opening 20b of the heat storage body housing portion 20 without adjusting the amount of the heated gas G4 from the second port P2. In detail, before opening the on-off valve V4 of the heat medium flow path R4, the on-off valve V5 of the primary gas supply change portion 50 is closed, and the on-off valve V1 of the primary gas supply change portion 50 is opened. In this case, it is preferable that the first port P1 is removed from the factory steam pipe (not illustrated). In addition, it is preferable that the on-off valve V5 is closed before the on-off valve V1 is opened.

In the case of using the heated gas G4 to restore the heat storage body 10, the heat generation performance of the heat storage body 10 is restored by absorbing the heat of the heated gas passing through the heat storage body housing portion 20. Therefore, direct heat exchange with the heat storage body 10 can be performed in the case of restoring the heat generation performance of the heat storage body 10, too.

[Heat Storage Mode (Secondary Gas Decarboxylation Treatment of Heating Type)]

Figure 8:
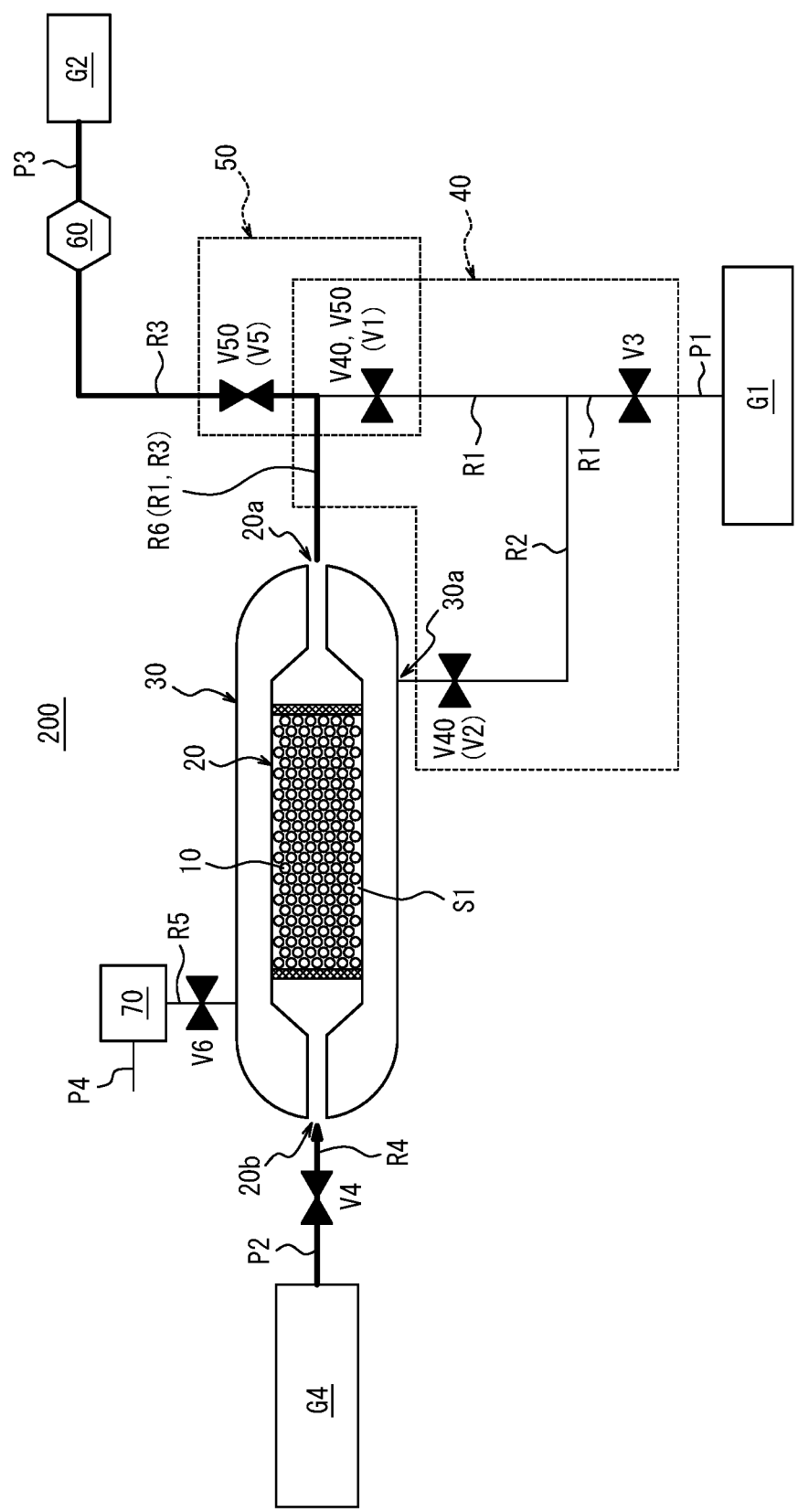
FIG. 8 is a schematic sectional view illustrating a regeneration step of a secondary gas decarboxylation treatment portion in another example of the heat storage mode in the heat storage and dissipation apparatus in FIG. 2.

For example, in the case where the secondary gas decarboxylation treatment portion 60 can be regenerated by heating, the heat storage and dissipation apparatus 200 according to this embodiment can perform the regeneration of the secondary gas decarboxylation treatment portion 60 simultaneously with the restoration of the heat generation performance of the heat storage body 10, as another example of its heat storage mode. FIG. 8 illustrates a step of regenerating the secondary gas decarboxylation treatment portion 60 in the heat storage mode, as another example of the heat storage mode of the heat storage and dissipation apparatus 200 according to this embodiment.

In the heat storage mode according to another example of this embodiment, the heated gas G4 supplied into the housing space S1 of the heat storage body housing portion 20 is released to the secondary gas flow path R3 instead of the primary gas flow path R1.

Specifically, the primary gas flow path R1 (the primary gas flow path R1 other than the common one path R6) is closed and the secondary gas flow path R3 is opened, to cause the first flow opening 20a of the heat storage body housing portion 20 and the third port P3 to communicate with each other. This enables restoration of the heat storage body 10 simply by supplying the heated gas G4 to the second flow opening 20b of the heat storage body housing portion 20 without adjusting the amount of the heated gas G4 from the second port P2, as in the heat storage mode in FIG. 7. In addition, in this heat storage mode, the heat of the heated gas G4 can also be used to regenerate the secondary gas decarboxylation treatment portion 60. In detail, after the end of the heat dissipation mode, the air compressor or the like is removed from the third port P3, and the second port P2 is connected to the factory steam pipe (not illustrated). In this case, too, it is preferable that the on-off valve V4 of the heat medium flow path R4 is closed. The primary gas supply change portion 50 maintains the state of the heat dissipation step in FIG. 6, where the on-off valve V5 is opened while the on-off valve V1 remains closed.

In this example, not only the restoration of the heat generation performance of the heat storage body 10 but also the regeneration of the secondary gas decarboxylation treatment portion 60 can be performed through direct heat exchange with the heat storage body 10. In the case where a primary gas decarboxylation treatment portion is provided, the restoration of the heat storage body 10 and the regeneration of the primary gas decarboxylation treatment portion can both be performed by the step in FIG. 7.

[Heat Storage Mode (Decompression Type)]

In the heat storage mode, the heat generation performance of the heat storage body 10 can be restored by decompressing the housing space S1 of the heat storage body housing portion 20. An example of the method of decompressing the housing space S1 uses the first to third ports P1 to P3 to seal one of the first flow opening 20a and the second flow opening 20b of the heat storage body housing portion 20 and suck air in the housing space S1 from the other one of the first flow opening 20a and the second flow opening 20b. In detail, the on-off valve V1 and the on-off valve V5 of the primary gas supply change portion 50 are closed, and the second port P2 is connected to a vacuum pump. Alternatively, the on-off valve V4 of the heat medium flow path R4 and the on-off valve V1 or the on-off valve V5 of the primary gas supply change portion 50 are closed, and the first port P1 or the third port P3 leading to the opened on-off valve of the primary gas supply change portion 50 is connected to the vacuum pump.

The heat storage and dissipation apparatus 200 according to this embodiment can perform direct heat exchange between the heat medium to be temperature-controlled (the primary gas G1, the secondary gas G2, or mixed gas thereof in this embodiment) and the heat storage body 10. The heat storage and dissipation apparatus 200 according to this embodiment therefore has improved heat exchange efficiency as compared with conventional heat storage and dissipation apparatuses. Moreover, the heat storage and dissipation apparatus 200 according to this embodiment does not need a heat exchange portion such as a heat medium flow path or a fin. The heat storage and dissipation apparatus 200 according to this embodiment can therefore be reduced in size, and has improved productivity, cost, etc.

The heat storage body may be, for example, formed by sintering the chemical heat storage material. Such a heat storage body formed by solidifying a powder is likely to pulverize due to, for example, degradation over time. It is therefore preferable to take various measures to keep the heat storage body 10 from pulverizing.

However, even when all possible measures are taken, there is still concern that the heat storage body 10 may partially pulverize.

In view of this, one object of this embodiment is to provide the heat storage and dissipation apparatus 200 capable of releasing gas Gc not containing any pulverized heat storage body 10.

The heat storage and dissipation apparatus 200 according to this embodiment preferably further includes at least one powder separation portion 80 that separates any powder from gas Gd released from the heat storage body housing portion 20. In this case, in the heat dissipation mode according to this embodiment, the heat medium G3 can be released to the second port P2, as the gas Gc not containing any pulverized heat storage body 10. Moreover, in the heat storage mode according to this embodiment, the heated gas G4 can be released to the first port P1 or the third port P3 as the gas Gc not containing any pulverized heat storage body 10.

Figure 9:
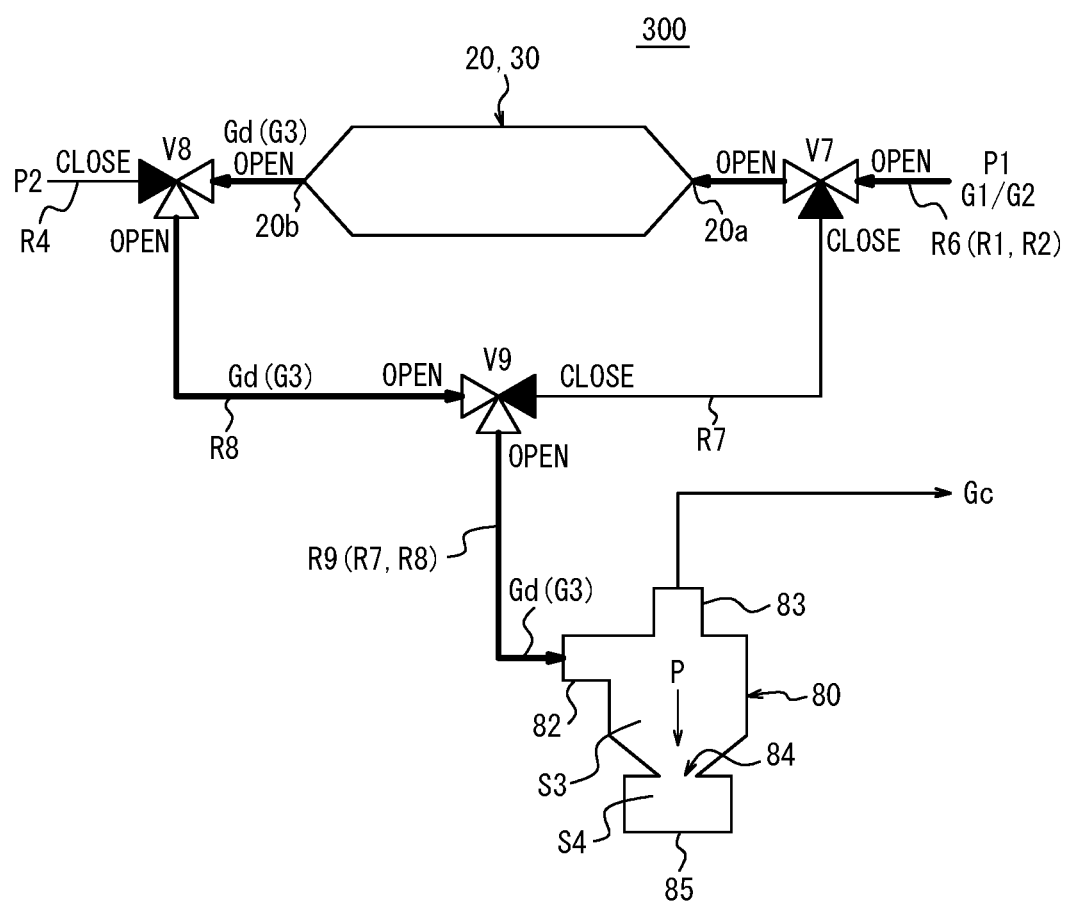
FIG. 9 is a schematic view illustrating a powder separation step in the heat dissipation mode in a powder separation circuit including a powder separation portion applicable to a heat storage and dissipation apparatus according to the present disclosure.
Figure 10:
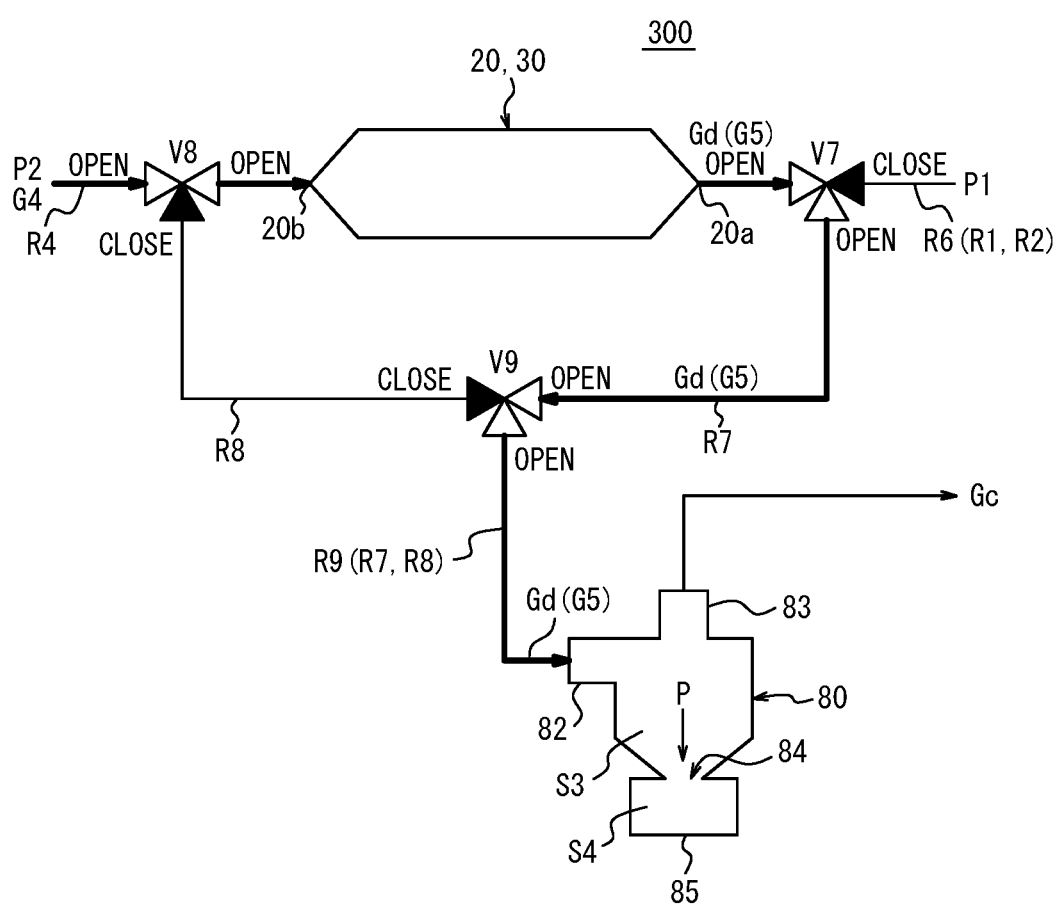
FIG. 10 is a schematic view illustrating a powder separation step in the heat storage mode in the powder separation circuit in FIG. 9.
Figure 11:
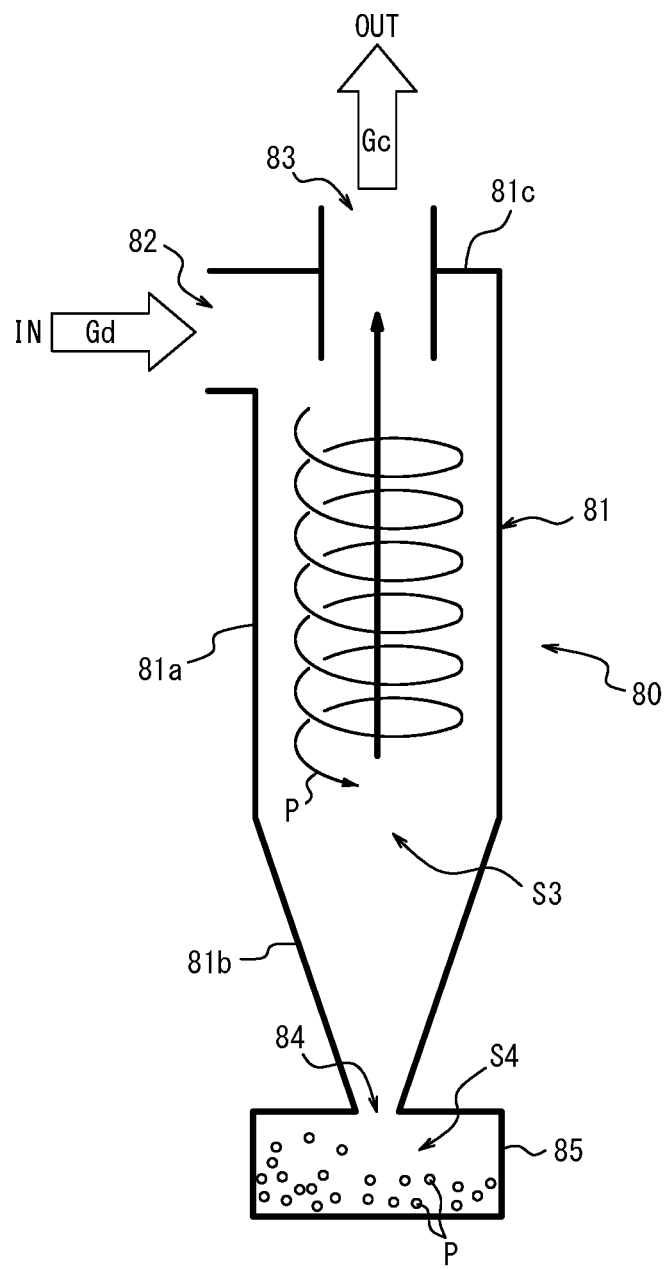
FIG. 11 is a sectional view schematically illustrating a centrifugation-type powder separator as an example of a powder separation portion applicable to the powder separation circuit in FIG. 9.

FIG. 9 schematically illustrates a powder separation step in the heat dissipation mode in a powder separation circuit 300 that includes a powder separation portion 80 and is applicable to the heat storage and dissipation apparatus 200 according to this embodiment. FIG. 10 schematically illustrates a powder separation step in the heat storage mode in the powder separation circuit 300 in FIG. 9. FIG. 11 schematically illustrates a centrifugation-type powder separator as an example of the powder separation portion 80.

As illustrated in FIGS. 9 and 10, the heat storage and dissipation apparatus 200 according to this embodiment can be provided with the powder separation circuit 300. In this embodiment, the powder separation circuit 300 includes one powder separation portion 80. The powder separation circuit 300 further includes a first introduction path R7 capable of introducing the gas Gd released from the first flow opening 20a of the heat storage body housing portion 20 into the powder separation portion 80, and a first switching valve V7 for causing the first flow opening 20a of the heat storage body housing portion 20 to communicate with the first introduction path R7, as illustrated in FIG. 10. The powder separation circuit 300 further includes a second introduction path R8 capable of introducing the gas Gd released from the second flow opening 20b of the heat storage body housing portion 20 into the powder separation portion 80, a second switching valve V8 for causing the second flow opening 20b of the heat storage body housing portion 20 to communicate with the second introduction path R8, and a third switching valve V9 for causing one of the first introduction path R7 and the second introduction path R8 to communicate with the powder separation portion 80, as illustrated in FIG. 9. In this case, the release of the gas Gc not containing any pulverized heat storage body 10 can be easily controlled by simple operation of merely controlling the three switching valves V7 to V9.

In this embodiment, the first introduction path R7 is a path branching off from the primary gas flow path R1. In this embodiment, the first introduction path R7 is connected to the powder separation portion 80. In this embodiment, the first switching valve V7 is located at the part at which the first introduction path R7 branches off from the primary gas flow path R1.

In this embodiment, the second introduction path R8 is a path branching off from the heat medium flow path R4. In this embodiment, the second introduction path R8 is connected to the powder separation portion 80. In this embodiment, the second switching valve V8 is located at the part at which the second introduction path R8 branches off from the heat medium flow path R4.

In this embodiment, the first introduction path R7 and the second introduction path R8 meet before reaching the powder separation portion 80. In detail, in this embodiment, a common one path R9 is formed between the part at which the first introduction path R7 and the second introduction path R8 meet and the powder separation portion 80. In this embodiment, the third switching valve V9 is located at the part at which the first introduction path R7 and the second introduction path R8 meet.

In this embodiment, the switching valves V7 to V9 each block one flow path selected from three flow paths meeting one another, and allow flow between the remaining two flow paths. For example, the switching valves V7 to V9 may each be a three-way valve. The switching valves V7 to V9 can block one flow path by manual operation, electric control, air control, or the like. The switching valves V7 to V9 may each be a ball valve or the like subjected to manual operation, electric control, or air control, or an electric control valve. The electric control valve includes, for example, one input port, two output ports, and one plunger electrically controllable by an electromagnetic solenoid or the like. By operating the plunger in the electric control valve, switching between the respective routes from the input port to the two output ports can be performed, and the respective routes from the input port to the two output ports can be closed.

In this embodiment, the powder separation portion 80 is a centrifugation-type powder separator (cyclone separator), as illustrated in FIG. 11. In this case, any powder P contained in the gas Gd can be easily separated simply by passing the gas Gd released from the housing space S1 of the heat storage body housing portion 20 through the powder separation portion 80.

In FIG. 11, the powder separation portion 80 includes a main body 81. In this embodiment, the main body 81 is composed of a cylindrical portion 81*a* whose upper end is closed by a lid portion 81*c*, and a conical portion 81*b* connected to the lower end of the cylindrical portion 81*a*. An internal space S3 is formed in the main body 81. The internal space S3 is defined by the inner surfaces of the cylindrical portion 81*a*, the conical portion 81*b*, and the lid portion 81*c*.

In this embodiment, the powder separation portion 80 has an inlet 82. In this embodiment, the inlet 82 is located in the cylindrical portion 81*a* of the main body 81. In this embodiment, the inlet 82 extends around the axis of the cylindrical portion 81*a* in the circumferential direction. The inlet 82 communicates with the internal space S3 of the main body 81.

In this embodiment, the powder separation portion 80 has an outlet 83. In this embodiment, the outlet 83 is located in the lid portion 81*c* of the main body 81. In this embodiment, the outlet 83 extends in the axial direction of the main body 81. The outlet 83 communicates with the internal space S3 of the main body 81.

In this embodiment, the powder separation portion 80 has a dust opening 84. The dust opening 84 is located in the conical portion 81*b* of the main body 81. In this embodiment, the dust opening 84 is an opening formed at the tapered end of the conical portion 81*b* (the lower end of the main body 81). The dust opening 84 communicates with the internal space S3 of the main body 81.

In this embodiment, the powder separation portion 80 includes a powder recovery portion 85. An internal space S4 is formed in the powder recovery portion 85. In this embodiment, the powder recovery portion 85 is connected to the conical portion 81*b* of the main body 81. The internal space S4 of the powder recovery portion 85 communicates with the internal space S3 of the main body 81 through the dust opening 84. In this embodiment, the powder recovery portion 85 is formed as part of the powder separation portion 80. The powder recovery portion 85 may be separated from the powder separation portion 80.

In the powder separation portion 80 according to this embodiment, when the gas Gd containing the powder P is introduced into the inlet 82, the gas Gd induces a vortex flow in the internal space S3. Here, the powder P is separated from the gas Gd. Consequently, the powder P is recovered by the powder recovery portion 85 through the dust opening 84. The gas from which the powder P has been separated is released from the outlet 83 as the gas Gc not containing any pulverized heat storage body 10.

Specific operations of the powder separation circuit 300 illustrated in FIGS. 9 and 10 will be described below, with reference to other drawings.

[Powder Separation Step (Heat Dissipation Mode)]

As illustrated in FIG. 9, in the heat dissipation mode according to this embodiment, the primary gas G1 and the secondary gas G2 are supplied to the first flow opening 20*a* of the heat storage body housing portion 20 through the common one path R6. The primary gas G1 and the secondary gas G2 supplied to the first flow opening 20*a* of the heat storage body housing portion 20 are released from the second flow opening 20*b* of the heat storage body housing portion 20 as the heated heat medium G3. The heat medium G3 is introduced into the inlet 82 of the powder separation portion 80 as the gas Gd containing the powder P. The heat medium G3 is separated between the gas Gc not containing any pulverized heat storage body 10 and the powder P, in the internal space S3 of the powder separation portion 80. The powder P is recovered by the powder recovery portion 85 through the dust opening 84 of the powder separation portion 80. The heat medium G3 is released to the outlet 83 of the powder separation portion 80 as the gas Gc not containing any pulverized heat storage body 10. Therefore, by connecting, for example, the high-temperature gas supply pipe (not illustrated) to the outlet 83 of the powder separation portion 80, clean gas Gc not containing any pulverized heat storage body 10 can be supplied to the desired part as the heat medium G3.

Specifically, the first introduction path R7 (the first introduction path R7 other than the common one path R9) is closed to cause the common one path R6 to communicate with the first flow opening 20*a* of the heat storage body housing portion 20. Consequently, the primary gas G1 and the secondary gas G2 are supplied to the first flow opening 20*a* of the heat storage body housing portion 20. In detail, the first switching valve V7 is controlled to open the common one path R6 (first port P1, third port P3) and close the first introduction path R7 (the first introduction path R7 other than the common one path R9).

Moreover, the second port P2 is closed to cause the second flow opening 20*b* of the heat storage body housing portion 20 to communicate with the powder separation portion 80. Hence, the heat medium G3 is released from the powder separation portion 80 as clean gas Gc not containing any pulverized heat storage body 10. In detail, the second switching valve V8 is controlled to close the heat medium flow path R4 (between the second port P2 and the second switching valve V8) and open the second introduction path R8 (between the second switching valve V8 and the third switching valve V9). In addition, the third switching valve V9 is controlled to open the common one path R9 (second introduction path R8).

[Powder Separation Step (Heat Storage Mode)]

As illustrated in FIG. 10, in the heat storage mode according to this embodiment, the heated gas G4 is supplied to the second flow opening 20*b* of the heat storage body housing portion 20 through the heat medium flow path R4. The heated gas G4 supplied to the second flow opening 20b of the heat storage body housing portion 20 is released from the first flow opening 20a of the heat storage body housing portion 20 as gas G5 from which heat has been absorbed by the heat storage body 10. The heat-absorbed gas G5 is introduced into the inlet 82 of the powder separation portion 80 as the gas Gd containing the powder P. The heat-absorbed gas G5 is separated between the gas Gc not containing any pulverized heat storage body 10 and the powder P, in the internal space S3 of the powder separation portion 80. The powder P is recovered by the powder recovery portion 85 through the dust opening 84 of the powder separation portion 80. The gas G5 is released to the outlet 83 of the powder separation portion 80 as the gas Gc not containing any pulverized heat storage body 10. Therefore, by connecting, for example, an exhaust pipe (not illustrated) to the outlet 83 of the powder separation portion 80, clean gas Gc not containing any pulverized heat storage body 10 can be discarded as exhaust gas.

Specifically, the second introduction path R8 (the second introduction path R8 other than the common one path R9) is closed to cause the heat medium flow path R4 to communicate with the second flow opening 20b of the heat storage body housing portion 20. Consequently, the heated gas G4 is supplied to the second flow opening 20b of the heat storage body housing portion 20. In detail, the second switching valve V8 is controlled to open the heat medium flow path R4 (second port P2) and close the second introduction path R8 (the second introduction path R8 other than the common one path R9).

Moreover, the common one path R6 (except between the first flow opening 20a of the heat storage body housing portion 20 and the first switching valve V7) is closed to cause the first flow opening 20a of the heat storage body housing portion 20 to communicate with the powder separation portion 80. Hence, the heat-absorbed gas G5 is released as clean gas Gc not containing any pulverized heat storage body 10. In detail, the first switching valve V7 is controlled to close the common one path R6 (except between the first flow opening 20a of the heat storage body housing portion 20 and the first switching valve V7) and open the first introduction path R7 (between the first switching valve V7 and the third switching valve V9). In addition, the third switching valve V9 is controlled to open the common one path R9 (first introduction path R7).

<Heat Storage Body>

In this embodiment, the heat storage body 10 is, for example, a powdery product, a ground product, or a formed product. In particular, the heat storage body 10 is preferably a powdery body. The particle diameter of the powdery body is preferably more than that of a powdery product with a particle diameter of more than 0 mm and 0.05 mm or less, for example. The particle diameter of the powdery body is particularly preferably such a size that a maximum diagonal length L, i.e. the distance between the vertices of one heat storage body 10 (powdery body) farthest from each other, is more than 0.05 mm. In the case where the maximum diagonal length L of one heat storage body 10 (powdery body) is less than 0.05 mm, a pressure drop in ventilation is excessively large, which tends to impair the ventilation function significantly. Besides, dusting starts to occur, which tends to impair handleability. Herein, "dusting" denotes a state in which it is visually recognizable that a powder rises and suspends in the air.

In the case where the heat storage body 10 is a formed product, the heat storage body 10 can be classified depending on the difference in the forming step (herein, "forming step" widely denotes a "step of forming into a given shape") in the production. Examples of the heat storage body 10 as the formed product include "granules" formed by granulation and "pellets" formed by molding (herein, "molding" denotes "forming using a die"). The term "pellets" includes a powder or granules subjected to further molding. The production method for the heat storage body 10 is not limited to two types: granulation and molding. In the case where the heat storage body 10 is made of a chemical heat storage material containing a group 2 element compound, a boron compound, and a silicone polymer as mentioned above, its strength in the worked state is high. In the case where the heat storage body 10 is formed using such a chemical heat storage material into granules or pellets, pulverization due to an increase or decrease in the volume of the chemical heat storage material can be prevented, and the heat storage body 10 can withstand repeated heat generation and heat storage.

An example of the method of forming the heat storage body according to this embodiment will be described below. The method of forming the heat storage body according to this embodiment is, for example, a working method including a forming step and a burning step. The forming step is a step of forming a composition for chemical heat storage material formation by mixing the foregoing components by any method. For example, in the case where the heat storage body is "granules", a production method by granulation is employed. In the case where the heat storage body is "pellets", a production method by molding using a die is employed.

The production method for the heat storage body 10 of granule type will be described first.

Examples of the granule type production method include granulation methods such as rolling granulation, fluidized bed granulation, agitation granulation, compression granulation, extrusion granulation, and crushing granulation. The granule type production method may be any granulation method other than these methods. Two or more granulation methods may be combined for working. In the case where the particle diameter of the heat storage body 10 of granule type is 5 mm or more, rolling granulation and crushing granulation are preferred granulation methods.

In the burning step after the forming step, the formed composition for chemical heat storage material formation is burned. The burning step may be performed using an electric furnace or the like, although the device for burning is not limited.

When burning the composition for chemical heat storage material formation in the burning step, resin, substances made of carbon, and hydrocarbon vaporize. As a result, they are removed from the heat storage body 10. The chemical heat storage material has pores formed as a result of removing resin, substances made of carbon, hydrocarbon, and the like.

In the burning step, the formed composition for chemical heat storage material formation is preferably burned at 200° C. to 1200° C., and more preferably burned at 300° C. to 1000° C. In the case where the formed composition for chemical heat storage material formation is burned at a temperature of less than 200° C. in the burning step, the chemical heat storage material tends to collapse due to insufficient burning. In the case where the formed composition for chemical heat storage material formation is burned at a temperature of more than 1200° C., the heat storage performance of the chemical heat storage material tends to decrease because the group 2 element compound cannot maintain an oxide state.

In the burning step, the formed composition for chemical heat storage material formation is preferably burned for 30 to 120 min. Resin, substances made of carbon, and hydrocarbon may remain in the chemical heat storage material after the burning step, in a range in which the function of the chemical heat storage material is not impaired. In the case where the burning time in the burning step is less than 30 min, the chemical heat storage material tends to collapse due to insufficient burning. In the case where the burning time is more than 120 min, the chemical heat storage material tends to collapse due to the formation of air bubbles inside the chemical heat storage material.

Thus, the heat storage body 10 used in each embodiment of the present disclosure can be produced through the granulation step and the burning step. The particle diameter of the heat storage body 10 less than 3 mm can be measured using, for example, a laser diffraction-type particle size distribution measuring apparatus (e.g. SALD-3100 made by Shimadzu Corporation). The particle diameter of the heat storage body 10 of granule type more than 3 mm can be measured by randomly extracting 100 heat storage bodies 10 and measuring the maximum diagonal length by a microgauge. Herein, the particle diameter of the heat storage body 10 of granule type is a median diameter, unless otherwise noted. The heat storage body 10 housed in the housing space S1 of the heat storage body housing portion 20 may be only granules obtained by the same granulation, or a mixture of two or more types of granules obtained by different granulation.

The shape of the heat storage body 10 of granule type will be described below.

The minimum diameter (particle diameter) of the heat storage body 10 of granule type usable in each embodiment, which is measured by the particle diameter measurement method, is preferably 0.05 mm or more, desirably 0.1 mm or more, and further desirably 0.5 mm or more. The maximum diameter (particle diameter) of the heat storage body 10 of granule type is preferably 100 mm or less, desirably 10 mm or less, and further desirably 8 mm or less. The maximum diameter (particle diameter) of the heat storage body 10 of granule type may be more than 100 mm. In terms of productivity, however, the below-described heat storage body 10 of pellet type is preferable.

The production method for the heat storage body 10 of pellet type will be described below.

In the pellet type molding step, using the plasticity of the chemical heat storage material, the heat storage body 10 can be produced by extrusion molding, compression molding using a die or a tablet, injection molding, or sheet molding, a subsequent die cutting step, etc. (hereafter also referred to as "extrusion molding, etc."). Extrusion molding is particularly preferable. Extrusion molding has a high facility adoption rate as compared with other molding methods, and is excellent in both economy and productivity.

After the molding step, the same burning step as in the granule type production is performed, as a result of which the heat storage body 10 of pellet type is obtained.

The shape of the heat storage body 10 of pellet type will be described below.

Figure 12:
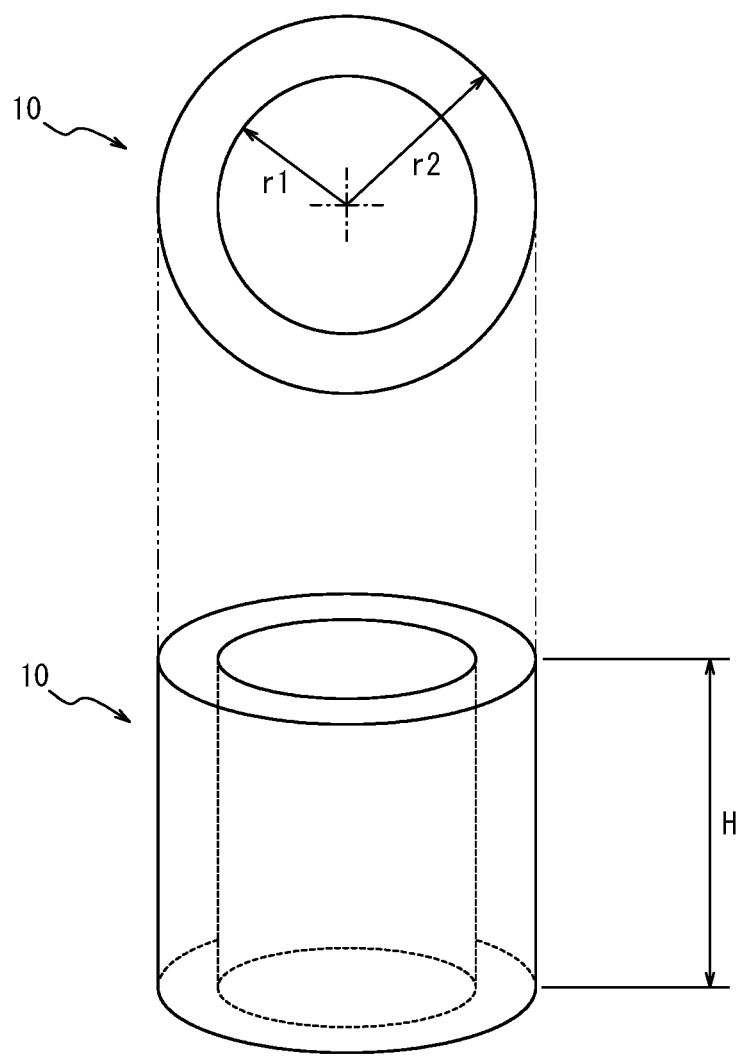
FIG. 12 is a top view and a perspective view illustrating an example of the heat storage body usable in the heat storage and dissipation apparatus according to the present disclosure.

The shape of the heat storage body 10 of pellet type may be any solid shape obtained by extrusion molding, etc. In this case, the shape of the heat storage body 10 is not limited. In terms of permeability, however, the shape of the heat storage body 10 is preferably a hollow shape, e.g. a cylindrical shape as illustrated in FIG. 12. The term "hollow" herein denotes that the inside is hollowed. The term "hollow" includes not only a through hole such as the cylindrical shape illustrated in FIG. 12, but also a recess formed as a result of one side being opened, a closed space, and the like. The dimensions of the heat storage body 10 of pellet type will be described below, using the signs in FIG. 12.

For the heat storage body 10 of pellet type illustrated in FIG. 12, the height of the cylinder (hereafter also simply referred to as "cylinder height") is denoted by H, the radius of the inner circumference by r1, the radius of the outer circumference by r2, and the ratio of the inner circumferential radius r1 to the outer circumferential radius r2 by k ($=r1/r2$) ($0 \leq k < 1$). Let the volume of the heat storage body 10 denoted by V, and the surface area of the heat storage body 10 denoted by S. The specific surface area of the heat storage body 10 of pellet type illustrated in FIG. 12 can be determined by calculating the volume and the surface area of the cylinder from the cylinder height H, the inner circumferential radius r1, and the outer circumferential radius r2 and then finding the ratio of the volume V and the surface area S. The calculation result demonstrates that the heat storage body 10 of pellet type illustrated in FIG. 12 is advantageous in ventilation, because it is larger when k is closer to 1 and H is smaller.

The strength of the heat storage body 10 of pellet type is at its maximum when k=0, i.e. the heat storage body 10 does not have a hollow shape. The strength of the heat storage body 10 of pellet type can be adjusted, for example, based on $H = 2 \cdot r2$.

The ranges of desired dimensions expressed using the cylinder height H, the outer circumferential radius r2, and the ratio k are as follows. In the present disclosure, the below-described desired dimensions do not impose any limitation on the shape of the heat storage body 10 of pellet type illustrated in FIG. 12.

If the cylinder height H is 0.1 mm or more, the heat storage body 10 of pellet type illustrated in FIG. 12 can be formed without a problem. In terms of the strength of the heat storage body 10, however, the cylinder height H is preferably close to $H = 2 \cdot r2$.

The outer circumferential radius r2 is 3 mm to 300 mm. The heat storage body 10 of pellet type illustrated in FIG. 12 in this range is suitable for production by extrusion molding. If the outer circumferential radius r2 is 3 mm or less, the heat storage body 10 of granule type is preferable in terms of productivity. If the ratio k is 0.1 or less, permeability tends to be low. If the ratio k is 0.95 or more, molding of a strong heat storage body 10 tends to be difficult.

The heat storage body 10 according to each of the foregoing embodiments is not limited to a heat storage body of granule type, pellet type, or the like, but includes, for example, a heat storage body obtained by applying the composition for chemical heat storage material formation to the cylindrical member 21 of the heat storage body housing portion 20 of the heat storage and dissipation apparatus 100 or 200 and then burning the composition.

Each of the foregoing embodiments is merely one of the disclosed embodiments, and various changes are possible according to the scope of the claims. For example, the powder separation circuit 300 may be applied to the heat storage and dissipation apparatus 100 according to the embodiment. The powder separation portion 80 may be independently applied to the heat storage and dissipation apparatuses 100 and 200 according to the embodiments. Thus, the components in the heat storage and dissipation apparatuses according to the foregoing embodiments may be replaced or combined as appropriate.

REFERENCE SIGNS LIST 10 heat storage body
20 heat storage body housing portion
20a first flow opening
20b second flow opening
21 cylindrical member (partition wall)
22 division wall
30 preheating portion
30a preheating gas inlet
30b preheating gas outlet
31 outer wall member
40 same gas supply portion
50 primary gas supply change portion
60 secondary gas decarboxylation treatment portion
70 drain chamber
80 powder separation portion
81 main body
81a cylindrical portion
81b conical portion
81c lid portion
82 inlet
83 outlet
84 dust opening
85 powder recovery portion
100 heat storage and dissipation apparatus
200 heat storage and dissipation apparatus
G0 preheating gas
G1 primary gas
G2 secondary gas
G3 heat medium
G4 heated gas (heat medium)
Gc gas not containing pulverized heat storage body 10
Gd gas released from heat storage body housing portion (gas containing powder)
P powder
P1 first port
P2 second port
P3 third port
R1 primary gas flow path
R2 preheating gas flow path
R3 secondary gas flow path
R4 heat medium flow path
R5 preheating gas discharge path
R6 common one path
R7 first introduction path
R8 second introduction path
R9 common one path
S1 housing space
S2 preheating gas-filled space
S3 internal space of main body
S4 internal space of powder recovery portion
V40 switching valve
V1 on-off valve
V2 on-off valve
V3 on-off valve
V4 on-off valve (switching valve)
V50 switching valve
V5 on-off valve
V6 on-off valve (switching valve)
V7 first switching valve
V8 second switching valve
V9 third switching valve

The invention claimed is:

1. A heat storage and dissipation apparatus comprising:
a heat storage body that reacts with a component contained in a primary gas; and
a heat storage body housing portion that houses the heat storage body,
wherein the heat storage body housing portion has:
a housing space that houses the heat storage body;
a first flow opening that communicates with the housing space and is capable of flowing the primary gas;
a second flow opening that communicates with the housing space and is capable of flowing the primary gas; and
the heat storage and dissipation apparatus further comprising
a preheating portion that preheats the housing space,
wherein the preheating portion has:
a preheating gas-filled space located adjacent to the housing space with a partition wall therebetween; and
a preheating gas inlet that communicates with the preheating gas-filled space and is capable of introducing a preheating gas.

2. The heat storage and dissipation apparatus according to claim 1, wherein the primary gas and the preheating gas are the same gas.

3. The heat storage and dissipation apparatus according to claim 2, further comprising
a same gas supply portion capable of supplying the same gas to the first flow opening of the heat storage body housing portion and the preheating gas inlet of the preheating portion.

4. The heat storage and dissipation apparatus according to claim 3, wherein the same gas supply portion includes:
a primary gas flow path capable of supplying the same gas to the first flow opening of the heat storage body housing portion;
a preheating gas flow path that branches off from the primary gas flow path and is capable of supplying the same gas to the preheating gas inlet of the preheating portion; and
at least one switching valve that causes at least one of the primary gas flow path and the preheating gas flow path to communicate with corresponding at least one of the first flow opening of the heat storage body housing portion and the preheating gas inlet of the preheating portion.

5. The heat storage and dissipation apparatus according to claim 1, further comprising
a primary gas supply change portion capable of supplying at least one of the primary gas and a secondary gas different from the primary gas, to the first flow opening of the heat storage body housing portion.

6. The heat storage and dissipation apparatus according to claim 5, wherein the primary gas supply change portion includes:
a primary gas flow path capable of supplying the primary gas to the first flow opening of the heat storage body housing portion;
a secondary gas flow path that meets the primary gas flow path and is capable of supplying the secondary gas to the first flow opening of the heat storage body housing portion; and
at least one switching valve that causes at least one of the primary gas flow path and the secondary gas flow path to communicate with the first flow opening of the heat storage body housing portion.

7. The heat storage and dissipation apparatus according to claim 5, further comprising a secondary gas decarboxylation treatment portion that subjects the secondary gas to decarboxylation treatment.

8. The heat storage and dissipation apparatus according to claim 1, further comprising
a primary gas decarboxylation treatment portion that subjects the primary gas to decarboxylation treatment.

9. The heat storage and dissipation apparatus according to claim 1, further comprising
at least one powder separation portion that separates a powder from a gas released from the heat storage body housing portion.

10. The heat storage and dissipation apparatus according to claim 9, wherein the at least one powder separation portion is one powder separation portion, and
the heat storage and dissipation apparatus further comprises:
a first introduction path capable of introducing a gas released from the first flow opening of the heat storage body housing portion into the one powder separation portion;
a first switching valve that causes the first flow opening of the heat storage body housing portion to communicate with the first introduction path;
a second introduction path capable of introducing a gas released from the second flow opening of the heat storage body housing portion into the one powder separation portion;
a second switching valve that causes the second flow opening of the heat storage body housing portion to communicate with the second introduction path; and
a third switching valve that causes one of the first introduction path and the second introduction path to communicate with the powder separation portion.

11. The heat storage and dissipation apparatus according to claim 9, wherein the powder separation portion includes a centrifugation-type powder separator.

12. The heat storage and dissipation apparatus according to claim 6, further comprising
a secondary gas decarboxylation treatment portion that subjects the secondary gas to decarboxylation treatment.

13. The heat storage and dissipation apparatus according to claim 11, wherein the powder separation portion includes a centrifugation-type powder separator.

\* \* \* \* \*